(12) United States Patent
Seemiller

(10) Patent No.: US 10,283,128 B2
(45) Date of Patent: May 7, 2019

(54) CODED ACOUSTIC SIGNAL COMMUNICATION WITH SEPARATE CODE-ASSOCIATED DATA COMMUNICATION

(71) Applicant: Daniel Seemiller, Ventura, CA (US)

(72) Inventor: Daniel Seemiller, Ventura, CA (US)

(*) Notice: Subject to any disclaimer, the term of this patent is extended or adjusted under 35 U.S.C. 154(b) by 0 days.

(21) Appl. No.: 16/053,743

(22) Filed: Aug. 2, 2018

(65) Prior Publication Data

US 2018/0342254 A1 Nov. 29, 2018

Related U.S. Application Data

(63) Continuation of application No. 15/821,681, filed on Nov. 22, 2017, now Pat. No. 10,043,524, which is a
(Continued)

(51) Int. Cl.
*G10L 19/018* (2013.01)
*G06F 17/30* (2006.01)
(Continued)

(52) U.S. Cl.
CPC .......... *G10L 19/018* (2013.01); *G06F 16/433* (2019.01); *G06F 16/683* (2019.01); *H04H 2201/37* (2013.01)

(58) Field of Classification Search
CPC ... G10L 19/018; G06F 16/433; G06F 16/683; H04H 2201/37
See application file for complete search history.

(56) References Cited

U.S. PATENT DOCUMENTS

| 6,411,800 B1 | 6/2002 | Emerson, III |
| 6,430,227 B1 | 8/2002 | Kroeger et al. |

(Continued)

FOREIGN PATENT DOCUMENTS

| EP | 2622511 | 8/2013 |
| WO | 2012042276 A2 | 4/2012 |

OTHER PUBLICATIONS

Matsuoka et al., Acoustic Communication System Using Mobile Terminal Microphones, NTT DoCoMo Technical Journal, vol. 8, No. 2, Sep. 2006, pp. 4-12.
(Continued)

*Primary Examiner* — Mark Fischer
(74) *Attorney, Agent, or Firm* — Kolisch Hartwell, P.C.

(57) ABSTRACT

A composite signal having frequencies within a sonic first frequency bandwidth may be received from a communication media on a receiver. The composite signal may include an audio base signal and at least one code signal. The code signal may be encoded with a code. The composite signal may be output on a speaker, the speaker converting the composite signal into sound. While outputting the composite signal, a signal processing device may detect the output sound corresponding to the code signal. The code may be determined from the detected output sound corresponding to the code signal. Data associated with the code may be retrieved from a data storage device that is internal to or remote from the signal processing device. The retrieved data, when displayed on a display device, may be selected by a user. The signal processing device may automatically send signal-processing-device-specific data to a remote server when the code is determined or when the user inputs an input using the displayed code-associated data.

20 Claims, 19 Drawing Sheets

Related U.S. Application Data continuation-in-part of application No. 14/977,502, filed on Dec. 21, 2015, now abandoned.

(60) Provisional application No. 62/094,762, filed on Dec. 19, 2014.

(51) Int. Cl.
*G06F 16/432* (2019.01)
*G06F 16/683* (2019.01)

(56) References Cited

U.S. PATENT DOCUMENTS

| | | |
|---|---|---|
| 7,379,901 B1 | 5/2008 | Philyaw |
| 2002/0107596 A1 | 8/2002 | Thomas et al. |
| 2007/0063027 A1 | 3/2007 | Belfer et al. |
| 2009/0233582 A1 | 9/2009 | Suzuki et al. |
| 2009/0264149 A1 | 10/2009 | Miller et al. |
| 2010/0075593 A1 | 3/2010 | Lee et al. |
| 2010/0134278 A1 | 6/2010 | Srinivasan et al. |
| 2010/0146115 A1 | 6/2010 | Bezos |
| 2010/0223138 A1 | 9/2010 | Dragt |
| 2012/0061460 A1 | 3/2012 | Mackley et al. |
| 2012/0084131 A1 | 4/2012 | Bergel et al. |
| 2013/0102242 A1 | 4/2013 | Anzures et al. |
| 2015/0088495 A1 | 3/2015 | Jeong et al. |

OTHER PUBLICATIONS https://web.archive.org/web/20130101002554/http://www.bbc.co.uk/, published Jan. 1, 2013, 3 pages.
U.S. Patent and Trademark Office, Office Action for U.S. Appl. No. 12/926,470, dated Mar. 25, 2015, 24 pages.
Chirp.IO Developer, Hello, Developers! webpage; retrieved from the internet on Dec. 21, 2015, from https://developer.chirp.io/sdk/evaluation, 2 pages.
U.S. Receiving Office, International Search Report for PCT Application No.. PCT/US2015/067193, dated Feb. 16, 2016, 2 pages.
U.S. Receiving Office, Written Opinion for PCT Application No. PCT/US2015/067193, dated Feb. 16, 2016, 8 pages.
U.S. Patent and Trademark Office, Office Action for U.S. Appl. No. 14/977,502, dated Jan. 17, 2017, 33 pages.
U.S. Patent and Trademark Office, Office Action for U.S. Appl. No. 14/977,502, dated May 17, 2017, 10 pages.
U.S. Patent and Trademark Office, Office Action for U.S. Appl. No. 14/977,502, dated Aug. 25, 2017, 11 pages.

Command List 200

| Command | Value | UARC | 123456780 | ~wX4#5^gZ |
|---|---|---|---|---|
| Heading | Pacific Storm | | Pacific Storm | Evening News |
| Web | http://NOAA.gov | | Website | Top 3 Stories |
| Map | City Center, MD | | Storm Map | Stock Report |
| Call | 1-800-555-1212 | | Call to Report | Sports |

202 — Command List
204 — Value
208 — UARC
210
212
220

FIG. 2

CODED ACOUSTIC SIGNAL COMMUNICATION WITH SEPARATE CODE-ASSOCIATED DATA COMMUNICATION

RELATED APPLICATIONS

This application is a continuation of U.S. patent application Ser. No. 15/821,681, filed Nov. 22, 2017 and titled "Interactive Data Communication with Acoustic Signal Communication", issuing as U.S. Pat. No. 10,043,524 on Aug. 7, 2018, which application is a continuation in part of U.S. patent application Ser. No. 14/977,502, filed Dec. 21, 2015 and titled "Data Communication with Acoustic Signal Communication", which claims the benefit of U.S. Provisional Application No. 62/094,762, filed Dec. 19, 2014 and titled "Tone Command", which application is incorporated herein by reference in its entirety for all purposes.

FIELD

This disclosure relates to data communication associated with a distributed audio signal, and in particular data communication between a provider of a code signal and a device receiving the audio signal.

BACKGROUND

Audio and video communications communicate information ephemerally. Such media content, such as a phone number, web site, or address, may not be remembered by a listener or viewer. Spontaneously recording such information may not be possible or may be impractical depending on the concurrent activities of the recipient of the information.

Additionally, producers of media content, such as news, weather, traffic, sports, advertisers, music and video, do not have a way to easily provide listeners or viewers with links to additional content. They also are unable to easily determine how many people are listening and more importantly, how many are responding to a particular media production, at least contemporaneously with the distribution of the media content.

SUMMARY

The present disclosure relates to a system and method that may provide a user with data associated with media content received on a user device and can include providing feedback to a producer of the audible signal with information about recipients of the media content. In some embodiments, a method may include receiving on a signal processing device a code and code-associated data associated with the code from a data-base server that is remote from the signal processing device, and storing on an internal data storage device of the signal processing device the received code and the code-associated data. After storing on the internal data storage device the received code and code-associated data, the method may further include receiving from a communication media on a signal receiver a composite signal having frequencies within a sonic first frequency bandwidth, the composite signal including an audio base signal and at least one code signal, the code signal being encoded with the code, having a duration shorter than a duration of the base signal, and having a second frequency bandwidth within the first frequency bandwidth. The composite signal can be output on a speaker, the speaker converting the composite signal into sound. While the composite signal is being output, the signal processing device detects the output sound corresponding to the code signal, and determines the code from the detected output sound corresponding to the code signal. The signal processing device then automatically in response to determining the code and prior to displaying information in response to determining the code, determines whether code-associated data associated with the code is stored on the internal data storage device of the signal processing device. If it is determined that the code-associated data is stored on the internal data storage device, the code-associated data is retrieved from the internal data storage device; and the retrieved code-associated data is displayed on a display device of the signal processing device.

In some embodiments, a receiver assembly may include a signal receiver, a speaker, and a signal processing device. The signal receiver can be configured for receiving from a communication media a composite signal having frequencies within a sonic first frequency bandwidth, the composite signal including an audio base signal and a code signal, the code signal being encoded with a code, having a duration shorter than a duration of the base signal, and having a second frequency bandwidth within the first frequency bandwidth. The speaker can be operatively coupled to the signal receiver for outputting the composite signal, including the audio base signal and the code signal, as sound. The signal processing device can be configured to receive a code and code-associated data associated with the code from a database server that is remote from the signal processing device; and store on an internal data storage device of the signal processing device the received code and the code-associated data. The signal processing device can further detect the output sound corresponding to the code signal, and determine the code from the detected output sound corresponding to the code signal. Automatically in response to determining the code and prior to displaying information in response to determining the code, the signal processing device can determine whether code-associated data associated with the code is stored on the internal data storage device of the signal processing device. If it is determined that the code-associated data is stored on the internal data storage device, the code-associated data is retrieved from the internal data storage device and displayed.

In some embodiments, a computer program product includes at least one computer readable storage medium having computer readable program instructions embodied therewith. The computer readable program instructions, when executed by a processor, configure the processor to receive a code and code-associated data associated with the code from a data-base server that is remote from the signal processing device; and store on an internal data storage device of the signal processing device the received code and the code-associated data. The computer readable program instructions may further configure the processor to receive sound from a speaker outputting a composite signal including an audio base signal and a code signal, as sound, the composite signal having frequencies within a sonic first frequency bandwidth, and the code signal being encoded with a code, having a duration shorter than a duration of the base signal, and having a second frequency bandwidth within the first frequency bandwidth.

The computer readable program instructions may further configure the processor to detect the output sound corresponding to the code signal; and determine the code from the detected output sound corresponding to the code signal. Such computer readable program instructions may further configure the processor to automatically in response to determining the code and prior to displaying information in response to determining the code, determine whether code-associated data associated with the code is stored on an internal data storage device of the signal processing device. If it is determined that the code-associated data is stored on the internal data storage device, the computer readable program instructions may further configure the processor to retrieve from the internal data storage device, the code-associated data, and display the retrieved code-associated data.

Features, functions, and advantages may be achieved independently in various embodiments, or may be combined in yet other embodiments, further details of which can be seen with reference to the following description and drawings.

BRIEF DESCRIPTION OF THE DRAWINGS

FIG. 2 shows a list of exemplary commands that may be produced.

DETAILED DESCRIPTION

Overview

Figure 1:
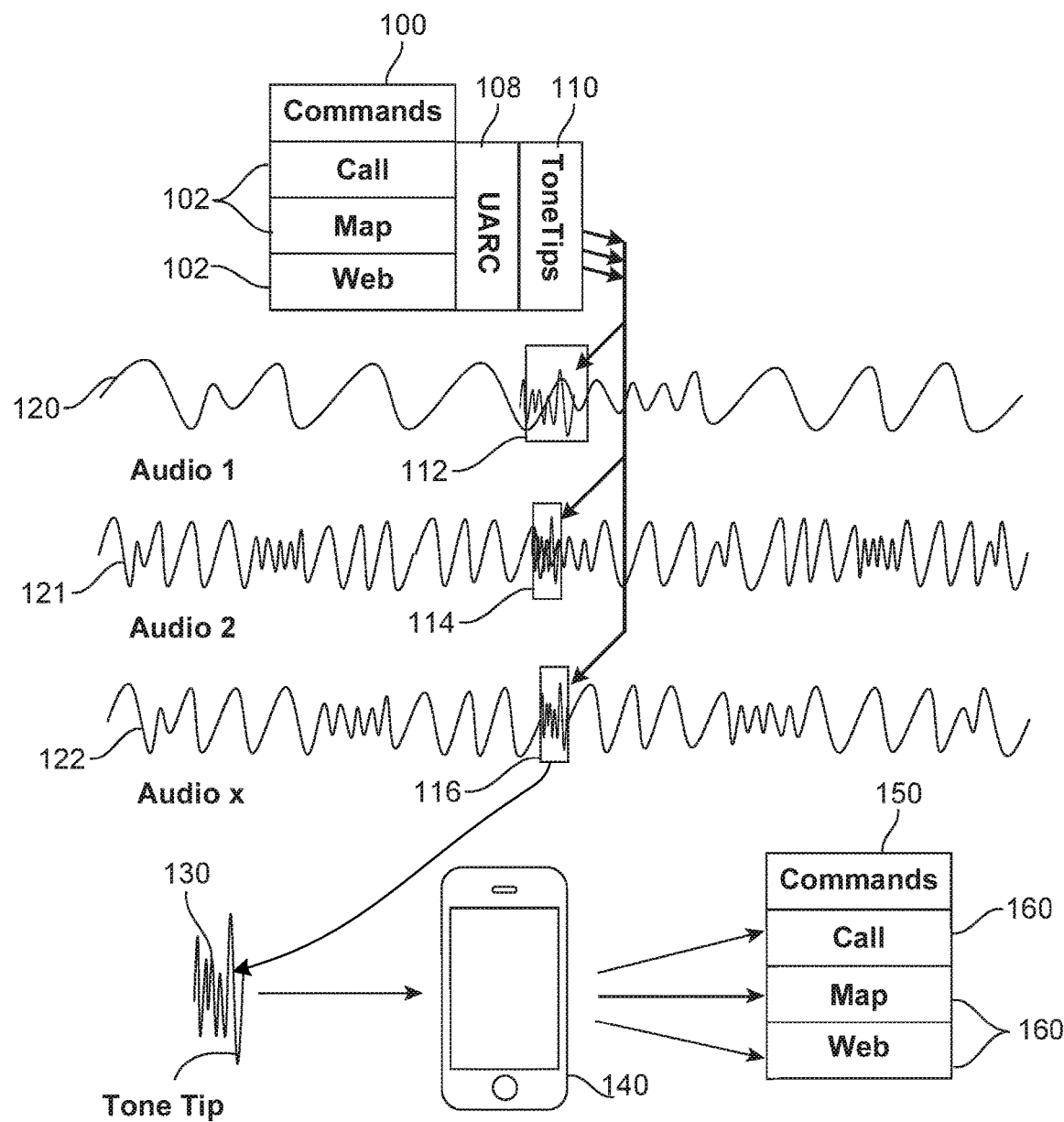
FIG. 1 shows a block diagram of an example of a communication system illustrating multiple occurrences of encoded audio code being decoded by a device and displaying related information.

Various embodiments of a communication system providing data to a signal processing device are described below and are illustrated in the associated drawings. Unless otherwise specified, a communication system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other communication systems or components. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Aspects of a communication system may be embodied as a computer method, computer system, or computer program product. Accordingly, aspects of the communication system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the communication system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the communication system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of a communication system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of a communication system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

FIG. 1 shows a simple block diagram of one example of a communication system illustrating multiple occurrences of encoded audio code being decoded by an audio signal processing device and displaying related information. The communication system may include the following process.

At step 100, a media producer may generate a list of commands or other user-device related items, all referred to generally as code-associated data. A command list may contain one or more commands.

At step 102, there may be several types of commands that a mobile device can process. Those include making a phone call, accessing a web site, providing a map, sending a text message, and displaying an image. The media producer may associate a value with each command line with optional attributes such as position, image map, color, text size, and background color. The list of commands and attributes may be stored as a database record for future retrieval. The list of commands and attributes may be transmitted and stored locally on an internal data storage device of the audio signal processing device as a local database record. Storing records locally on the audio signal processing device associate a list of commands or other information with a Unique Action Reference Code (UARC) (discussed further below). This local storage of the code and code-associated data allows the list of commands to be retrieved or acted upon.

At step 108, a Unique Action Reference Code (UARC) may be generated as a unique action code or a unique reference code to reference a database record. The unique reference code may be modified to accommodate various encoding methods.

At step 110, the unique reference code may be encoded into one or more unique audio files. The encoded audio files may be called tone tips or code signals. Each tone tip generated may be optimized for the media delivery. As an example, AM, FM, TV, and Internet radio have different waveform characteristics. One tone tip may be generated for radio 112, another for TV 114, and a third for Internet 116. Each tone tip generated may be optimized for the specific delivery media delivery At step 120, the tone tips may be merged with previously generated audio (an audio base signal) to form a composite signal, or used as independent audio files. Audio (1) 120, Audio (2) 121, and Audio (x) 122 may be numerous audio media delivery methods, such as radio, TV, internet, or public address system.

At step 130, the audio file or composite signal containing the tone tip may be played by a broadcaster such as radio, TV, internet, or public address system.

At step 140, an audio signal processing device may receive one or more tone tip. The audio signal processing device may decode the tone tip and extract the unique reference code. The audio signal processing device may use more than one decoding method at a time.

At step 150, the unique reference code may be used to process an action or retrieve commands from the database. The database may located externally on a remote data storage device or locally on an internal data storage device of the audio signal processing device.

At step 160, the list of commands and associated actions associated with the code may be retrieved and displayed on a display of the audio signal processing device 140.

Tone Commands

Tone Commands 200 may be a set of preselected commands, organized into a list 202, 1610 by a media producer. The commands may display on a smart phone, mobile device, computer, or other Audio signal Processing Device (APD) 1500, 1650. The commands may be actions such as call a phone number, display an address, go to a web site, send a text message, download an application, run a computer program, or other command available to the audio signal processing device as shown at 220. Commands may include routines, processes and actions available to an audio signal processing device. Commands typically include the specific command, a value 204, photo, and options as shown as an example in the table in FIG. 2. A Unique Action Reference Code (UARC) is assigned to and associated with each Tone Command List (TCL) 208. The tone command list is correspondingly code-associated data. The unique machine reference code may be numbers, characters, or any machine recognizable code. Examples include commands related to a storm report 210, news 212, advertisements, or any information that a producer wants to convey to a listener for display on an audio signal processing device.

The producer may select commands, values, and options (FIG. 2). Those commands may be organized into a list of one or more commands 210. It this example, the list of commands is called a Tone Command List (TCL). A unique code may be assigned to the tone command list by the Tone Command Center (TCC) database. The tone command data base may also be referred to as a remote data storage device or remote server. The unique code may be called a Unique Action Reference Code (UARC). The unique reference code may act as a reference link to the tone command list. Besides a reference link to addition information, the unique reference code in and of itself may contain action information to command the mobile device to process unique reference code information using a different method, such as sending a pilot code to switch decoding algorithms, or immediately process an action such as changing the screen to display a video, image, or a solid color.

Figure 3:
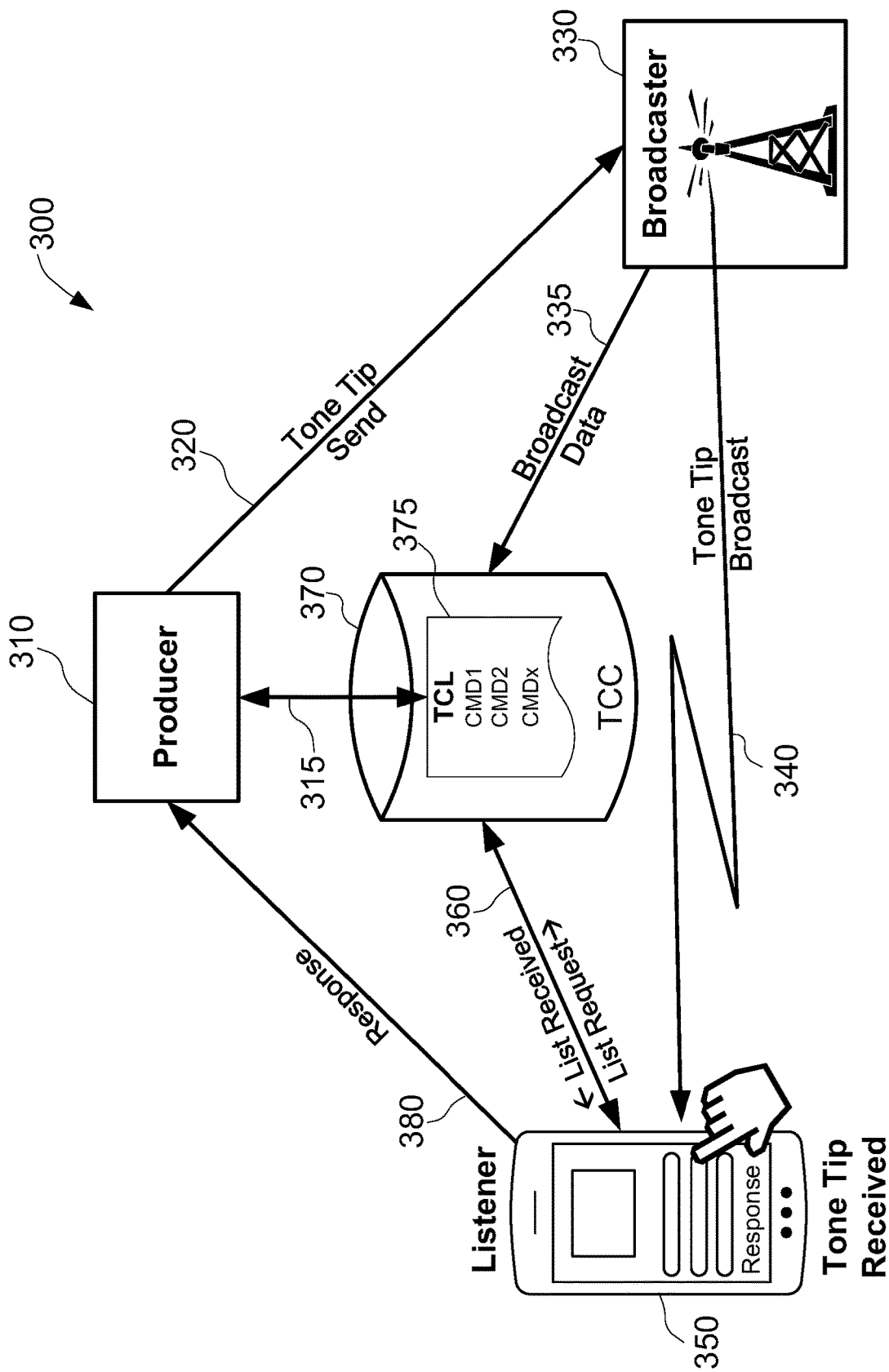
FIG. 3 shows an overview block diagram illustrating examples of command production, storage, broadcasting, retrieving, display and associated actions.

As shown in the example in FIG. 3 at 300, a media producer interface 310 may communicate at 315 with the tone command database 370 and generate a tone command list 375 that is stored in the tone command database 370. The tone command database is used throughout this document to refer to the associated tone command database server and associated data storage device on which the tone command database is stored. References to tone command database and tone command database server may be used interchangeably. The tone command database may encode the unique reference code from into one or more short audio files called tone tips. The tone command database may generate more than one tone tip file for each unique reference code. Tone tip audio files may be optimized for the media that will contain the tone tip.

The tone command database may send the tone tip files to the producer. The tone command database may also send code-associated data, such as a tone command list associated with the tone tip files to audio signal processing device 360 to be stored as a local database record on an internal data base device. The producer may send the audio Tone Tip Production (TTP) to one or more broadcasters 320. The broadcaster 330 in turn may transmit the tone tip link to one or more audio signal processing device 340. The broadcaster may send to the broadcaster data to the tone command database 335 for each tone tip media production file that was broadcast to the audio signal processing device.

The audio signal processing device 350 may receive and decode the tone tip back into a unique reference code, retrieve the code-associated tone command list 360 from the remote tone command database or from the local database on the internal data storage device of the audio signal processing device 350, and process any requested commands. The audio signal processing device may send acknowledgement 360 metadata to the tone command database 370 when a tone tip was received by the audio signal processing device. The metadata, also referred to as signal-processing-device-specific data is data that is specific to the signal processing device, such as data representative of a device unique identification number, device location, device maker, device model, or device operating system.

The audio signal processing device may send acknowledgement metadata to the tone command database when a user responds to actions presented on the tone command list. This acknowledgement metadata or signal-processing-device-specific data may further include data representative of a specific user action taken. A user (media listener or viewer) may then take action by using the audio signal processing device to respond to the tone command list. The media producer may receive a response from the audio signal processing device 380. Tone tips may be sent or stored using media such as radio, television, Internet, public address systems, media files, and sound reinforcement systems (public address systems).

Tone tips may be short unique encoded audio files that are embedded into audio, video and other media files. Tone tip audio files are typically less than ten seconds long. A tone tip of greater than ten seconds may be produced to send a file that contains more than eight characters of data. Tone tips may be linked to a menu of producer determined content. Tone tips may be broadcast to large audiences, or may be received individually. Tone tips may be decoded by a smart phone, tablet computer, or other audio signal processing device and then may be displayed as a menu of commands for the listener to take immediate action, record, bookmark for later use, or ignore.

Producer

Tone command production may start with the media producer interface 1610. A media producer may be responsible for production of audio and video media content. The media producer may be responsible for content delivery on several different media such as radio, TV, and Internet media. Media content may be a news story, traffic report, advertisement, documentary, training video, power point presentation, or any audio or video production. The producer content may contain references to information such as web sites, telephone numbers, addresses and other information. The producer may have a call to action such as asking listeners to vote on a topic, rank a subject, or post a comment.

Using the media producer interface 1610, the producer may select commands, values, and options to be processed and displayed by the audio signal processing device 1630, 1650. The commands may be arranged into a list called a Tone Command List (TCL). As an option, the tone command list may also contain headers, footers, images, image maps, videos, voice commands, and other display and control items. The commands may also be instant action commands such as display emergency information, display text data, or start a computer program. The producer may also selects the broadcast method, such as radio, TV, public address system, Internet, or any other method used to delivery audio information. The producer may select the broadcast type and may change the encoding and decoding schemes to best suit the broadcast method. The audio signal processing device may automatically select the best decoding algorithm to match the broadcast method. The producer or broadcaster may also include a pilot signal unique reference code to command the audio signal processing device to use the best decoding algorithm to match the broadcast method.

After the producer develops the tone command list, the list may be sent to the tone command database. The tone command database may assign a Unique Action Reference Code (UARC) to the tone command list. The producer may add metadata to the tone command list. The unique reference code may be encoded into one or more audio sequences for broadcast as a code signal. The audio encoded unique reference code may be referred to as a tone tip. The producer may insert the tone tip into one or more time locations within an audio base signal to produce an audio production or composite signal.

The producer may decide to insert only one tone tip into a short production such as a 10 second commercial, or may insert a plurality of tone tips into multiple locations within a long media production or presentation. The tone tip, when inserted into a production, may be called a Tone Tip Production (TTP). Tone command list metadata may be added to the tone tip media production file. The tone tip media production file may be the complete audio or video production including inserted tone tips. Several tone tips may be inserted into a tone tip media production file with the same unique reference code, but using different encoding techniques. Different encoding techniques may be used to deliver the same tone tip media production file to multiple broadcasters, such as Radio, TV, and streaming Internet such as NetFlix, Vimeo, and YouTube. The tone command database may produce one or more tone tip, each optimized for the media being used to deliver the audio or video production.

The producer may send the tone tip media production file to one or more broadcasters. The tone tip media production file may be broadcast to one or more audio signal processing devices via radio, television, Internet, gaming, public address systems, or other audio transmitting system. The tone tip media production file may also be sent to one or more audio signal processing device using computerized file storage and distribution systems including the Internet and computer storage systems. The audio signal processing device may receive and process the tone tip. The tone tip may be decoded back into a unique reference code. The unique reference code may be sent to the tone command database and used to recall the tone command list from the tone command database. The tone command list may be displayed on the audio signal processing device. The listener may then take action by selecting any of the commands displayed on the audio signal processing device. If the listener responds by taking action on the audio signal processing device, the response action may be sent back the tone command database along with audio signal processing device metadata. Consolidated listener responses may be sent to the producer and broadcaster. Instant action commands may be immediately processed by the audio signal processing device.

Broadcaster

A broadcaster may be any system capable of sending audio signals or metadata. The audio signals may be sent as radio frequency signals (RF), audio frequency signals (AF), video signals, or computer files that contain an audio signal. Radio frequency signals may include radio and television transmissions. Audio frequency signals may include public address systems such as audio systems found in public buildings, stadiums, theaters, schools, trains, ships, airplanes, busses, and other systems. Audio file systems may include Internet storage and distribution systems such as You Tube, Vimeo, iTunes, Netflix, Hulu, as well as networked and stand-alone computerized file storage systems. The broadcaster may send a tone tip media production file to one or more audio signal processing device.

The broadcaster may receive the Tone Tip media Production (TTP) from the producer with optional metadata. The broadcaster may transmit the tone tip media production file to one or more audio signal processing device, also referred to generally as a signal processing device. The broadcaster may also send Broadcaster Tone Tip Data (BTTD) to the tone command database. This broadcaster metadata may include broadcaster identification, station identification, tone tip transmit time, unique reference code, and other data relative to the broadcaster and tone tip media producer. After the broadcast, the broadcaster may retrieve metrics from the tone command database such as number of audio signal processing devices that received the tone tip media production file, type of response, and number of responses. Broadcaster tone tip data may also support history processing. History processing allows listeners to navigate back to previously transmitted tone tip media production files.

Radio Data System (RDS) is a communications protocol standard for embedding small amounts of digital information in conventional FM radio broadcasts. Radio Data System Radio Text (RDS-RT) is one function of RDS that allows radio stations to transmit 64-characters of free-form text. That text may be either static or synchronized with the programming. It is often seen on FM car radios when they display the station name, current song, and other broadcast information. RDS may be used to send command or file reference information such as a unique reference code. With FM radio, the unique reference code may be broadcast as part of the RDS-RT to the FM radio receiver. The FM receiver may extract the unique reference code from the RDS signal. A wireless or wired connection may send the unique reference code from the radio to the audio signal processing device. This may be used as an optional path to send the unique reference code to audio signal processing devices. Other communication data transmission methods may be used, such as DARC, Direct Band, PAD and PDS.

Television broadcasters embed data such as closed caption information within broadcast signals. The closed caption standard is CEA-708. PSIP is an ATSC TV protocol for carrying metadata within each TV channel. Multiple television standards and protocols allow information to be embedded within the broadcast signal. These various standards and protocols may be used to send command or file reference information such as unique reference code to TV receivers. The TV receiver may extract the unique reference code from the TV signal. A wireless or wired connection may send the unique reference code from the TV to the audio signal processing device.

The broadcaster may transmit station identification or other tone tips that do not display anything on the audio signal processing device. This may be used to determine the number, type, and location of audio signal processing devices within a region.

Listener

The "listener" is a signal processing device, such as an Audio signal Processing Device (APD), which may be a smartphone, tablet computer, or any other device capable of decoding audio signals. Alternately the audio signal processing device may receive the unique reference code through radio RDS or through TV ATSC or other TV protocols.

The audio signal processing device may receive a tone tip media production file from a broadcaster. The audio signal processing device may use more than one decoding method at a time to detect tone tips that were encoded using different methods. The audio signal processing device may decode the unique reference code from the tone tip media production file. Alternately, the unique reference code may be received as a digital signal through RDS-RT or ATSC protocol. The unique reference code may be sent to the tone command database and may also include audio signal processing device General Listener Data (GLD) metadata. The general listener data may include audio signal processing device metadata such as the model number of the device, geographic location, time of day and other metadata available from the audio signal processing device.

When the unique reference code is sent to the tone command database, it's called a Tone Command List Request (TCLR). A Tone Command List Request action acknowledges that an audio signal processing device has received and decoded a tone tip production. It is a data retrieval request by the audio signal processing device to retrieve data from the tone command database.

The tone command database receives the data retrieval request from the audio signal processing device, processes the request, and sends a tone command list to the audio signal processing device. The user may view the tone command list as displayed data items on a display device of the audio signal processing device and respond, or ignore the tone command list.

The listener may also choose to receive tone tips in background mode on the audio signal processing device. In background mode, the tone command list is saved to a history list that may be viewed at a later time. This is useful when the listener is busy with other activities, such as driving a car, but wants to access the tone command list information later.

The audio signal processing device response may be by using an input device, such as a touch screen device, or with voice commands using a voice command capable device. Instant action commands may be immediately processed by the audio signal processing device. The tone command database may record that the audio signal processing device received the tone command list.

If the listener responds to the tone command list by taking any action on the audio signal processing device, the tone command database may receive a Tone Command Response (TCR) from the audio signal processing device. This tone command action response is the user request message for information related to data on the user interface. The user request message may contain the specific listener actions responses, such as dialed number, displayed address, selected web site, or any other command selected. The tone command database may record and process the user request message and respond by providing the associated data to complete the command. The audio signal processing device may process commands including "call, map, navigate, web" and any other commands selected from the tone command list.

The tone command database may also send historical broadcaster data to the audio signal processing device. This may allow broadcaster tone command database history to be viewed on the audio signal processing device. The audio signal processing device may also select history information from any broadcaster that sends broadcaster tone tip data to the tone command database.

Tone Command Center (TCC):

The tone command center database may be used as a database and tone tip generation system to manage the tone command lists, tone tips, unique reference codes, metadata and interactions between producers, broadcasters, and listeners. The tone command database may also be responsible for registration and tracking of producers, broadcasters, and listeners. The tone command database may be a central database or a distributed database. The location of the tone command database may be selected by the audio signal processing device, or within the unique reference code.

The producer may develop a tone command list and sends it to the tone command database. The tone command database may store the tone command list and assign a Unique Action Reference Code (UARC) to each tone command list. The tone command list file may contain tone commands, header data, and footer data, in addition to descriptive, structural, and administrative metadata, all generally referred to as code-associated data. The tone command database may also store interactions from each device that received a tone tip. The interactions may include the reception of a tone tip on an audio signal processing device and a user response to each decoded tone tip. User response information sent to the remote server may include signal-processing-device-specific data or metadata such as data representative of a device unique identification number, a device type, a device operating system, a current date, a current time, and/or a device location. The unique reference code is a unique, set of characters that identify the file and data associated with the tone command list. The unique reference code may be represented using binary, octal, decimal, hex, ASCII, UTF-8, UTF-16, or other character encoding method. The unique reference code may also command the audio signal processing device to immediately process an action without user interaction.

The unique reference code may follow the same command and value format as tone commands, however the format is intended to be shorter to limit the number characters encoded and broadcast. The unique reference code may start with one or more characters as a command. There may an optional delimiter to separate the command from the value. There may also be options for the command and values.

A unique reference code may be encoded into audio or metadata files. The encoded audio is called a tone tip. State of the art encoding techniques may be used to convert unique reference code into one or more audio tone tip signals. The audio encoding method may depend on the method chosen to broadcast the tone tip. FM radio and Television have a wider bandwidth and higher frequency range than AM radio. FM radio may also encode the unique reference code into the broadcast signal using RDS-DT. TV may encode the unique reference code into the video or audio signal. Short Wave (SW), HF, VHF, radio typically has a narrower bandwidths than FM radio and typically benefit from having a longer duration tone to encode the same amount of data. Audio encoded for streaming media on the Internet uses various encoding methods and the bandwidth is depended upon the encoding method used. Larger bandwidth systems allow for higher frequency, shorter duration tone tips, while narrow bandwidth systems usually benefit from having longer duration tone tips to broadcast the same quantity of data. Due to the variations in broadcast methods, the tone command database may generate more than one tone tip for each unique reference code. The producer may choose which tone tip to use when producing audio or video to be broadcast.

Internet radio and video use compression and distribution techniques different than RF broadcast radio. Internet radio and video files typically use MPEG-3, MPEG-4 and HE-AAC encoding. Public address systems such as those in stadiums, theaters, schools, buildings, airplanes, busses and trains have characteristics different than radio and benefit from having encoding appropriate for each audio environment. The specific text to audio encoding method used will be based on the broadcast method and audio environment. State of the art encoding techniques may be used to encode the unique reference code into an audio tone tip for broadcast and to decode the tone tip back into a unique reference code at the audio signal processing device.

Modulation is a known method of encoding data on one or more carrier frequencies. Radio Frequency (RF) modulation techniques include AM, FM, DTMF, PSK, BPSK, QPSK, MFSK, OFDM and other state of the art techniques. The same modulation techniques may be used on audio signals. Demodulation techniques may be used by the Audio signal Processing Device (APD) to decode the tone tip signal back into a unique reference code. Demodulation techniques may utilize FFT, Sparse FFT transforms or other state of the art decoding techniques. Multiple sets of identical tone tips may also be broadcast in sequence. A pilot code signal may also be broadcast to enable the audio signal processing device to select the appropriate decoder algorithm. This may improve the bit error rate of the decoder and improve the probability of successful decoding.

Because of numerous broadcast methods, the tone command database may send multiple tone tip audio files to the producer for each unique reference code. One method may be to send three tone tip audio files, one optimized for TV, one optimized for AM radio, and one optimized for streaming media. This will allow the producer to select the tone tip audio file that's appropriate for the method being used to broadcast the audio or video production. The producer may decide to include all tone tip audio files within one media production to ensure all broadcast methods are covered with only one media file.

When the tone tip media production file is transmitted by a broadcaster, the broadcaster may send Broadcast Tone Tip Data (BTTD) to the tone command database. Broadcaster tone tip data may include broadcaster identification, time of day, and other relative broadcast metadata. The broadcaster tone tip data may be used by the tone command database to correlate audio signal processing device reception and response data with a particular broadcast. This may allow broadcasters and producers to determine how many listeners received the tone tip, how many responded to a particular broadcast, what command they selected, were the listeners were located and collect useful information from other audio signal processing device metadata. The consolidated data may also show the geographic audio signal processing device area, response rate and density. Producers may use audio signal processing device and broadcast data to determine the effectiveness for media productions as well as broadcasters. Broadcaster tone tip data may also be used to improve audio signal processing device decoding by receiving broadcaster history data while the audio signal processing device is listening to the broadcaster. This method may allow unique reference code information to be pushed to all audio signal processing devices listening to a particular broadcaster.

Tone Tip Applications

The sequences below provide details on examples of tone tip applications, starting with simple Text applications and concluding with integrated multi-function systems.

Direct Tone Text Processing

Figure 4:
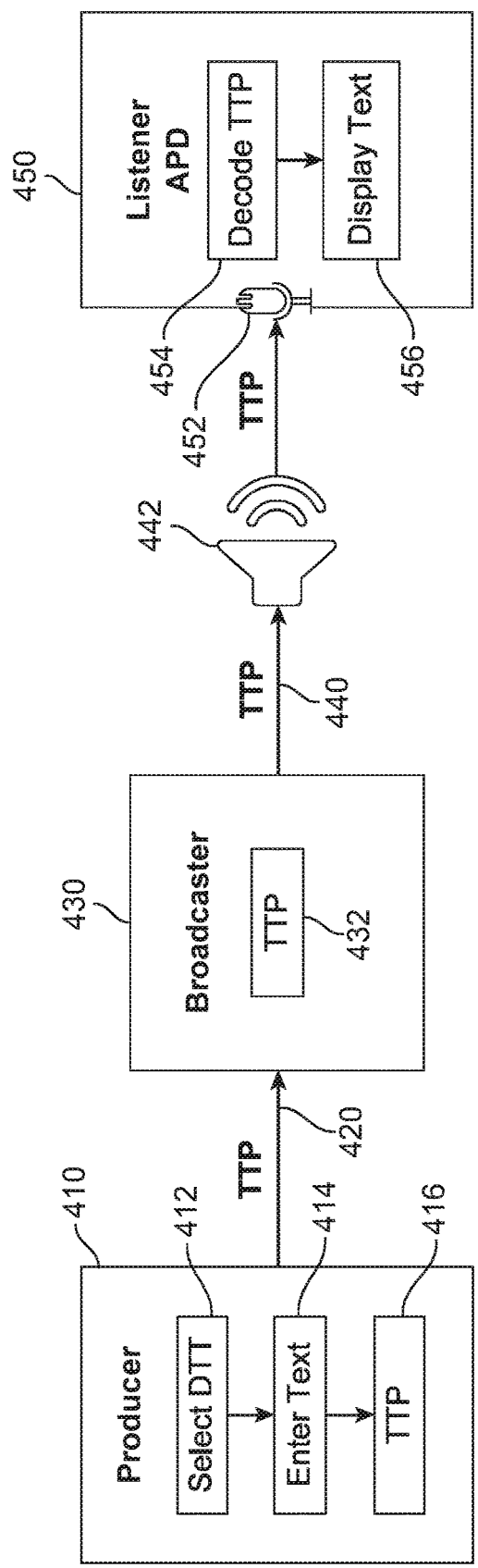
FIG. 4 shows a block diagram illustrating examples of encoding of text to audio and decoding of audio to text.

Referring to FIG. 4, at step 412, the producer selects Direct Text Tone (DTT).

At step 414, the producer enters text manually or the text may be automatically by using another program that accesses the direct text function.

At step 416, the producer creates one or more tone tip media production files for direct text. The unique reference code, containing the text content, is then automatically generated.

At step 420, the producer sends one or more tone tip media production files to the broadcaster 430.

At step 432, the broadcaster receives one more tone tip media production files.

At step 440, the broadcaster sends one or more tone tip media production files to audio signal processing devices 442 using radio or audio signals.

At step 450, the audio signal processing device receives at least one tone tip media production file by way of audio 452 or radio signals.

At step 454, the audio signal processing device decodes and processes the tone tip media production file.

At step 456, the audio signal processing device displays text.

Direct text application may send text data from one device to one more devices using encoded audio. Direct text may be sent from broadcast radio to many listeners, or by using two way communication radios between two or more devices. This may be useful during emergency conditions when the Internet and phone service is unavailable, but radio frequency broadcast and communication radios and televisions are functioning. More than one type of tone tip media production file may be broadcast in order to increase the probably of decoding.

FIG. 4 Illustrates Direct Tone Text (DTT) processing. The producer 410 may select direct text encoding at the user interface 412. The selection may include selecting the transmission method, such as Audio Frequency (AF), Radio Frequency (RF), or infrared options. The producer may also select encoding for high, medium, and low audio frequency bands. Frequency selection may be for RF or AF. The producer may select all encoding types and receive a tone tip media production file for each encoding type. The text to be sent may then be entered into the producer interface 414. Shorter text messages may produce a tone tip media production file of shorter duration while longer messages may benefit from having a longer duration. After entering text, the tone tip media production file 416 may be produced. The unique reference code may be created as part of this process.

The unique reference code format may follow a formatted sequence where there's a command, optional delimiter, followed by a value and possible options. In the case of direct text, the command may be a text message, or specific text data such as a phone number, GPS location, web site URL, phone command, or other categorized text data. One or more tone tip media production files may be sent to the broadcaster 420. The broadcaster may immediately send tone tip media production files 432 or store for later use. The broadcaster may send one or more tone tip media production files to one or more audio signal processing devices 440. The tone tip media production file may be sent as AF 442, RF or metadata. If the production file is sent as RF, it may be received by a radio and converted to audio. The tone tip media production file may be received at a microphone 452 by the audio signal processing device 450 and the unique reference code may be decoded by the audio signal processing device 454. The unique reference code may contain a Text Message command as well as the text message. The text message 456 may be displayed after decoding.

Direct Tone Text Processing—Smartphone

Figure 5:
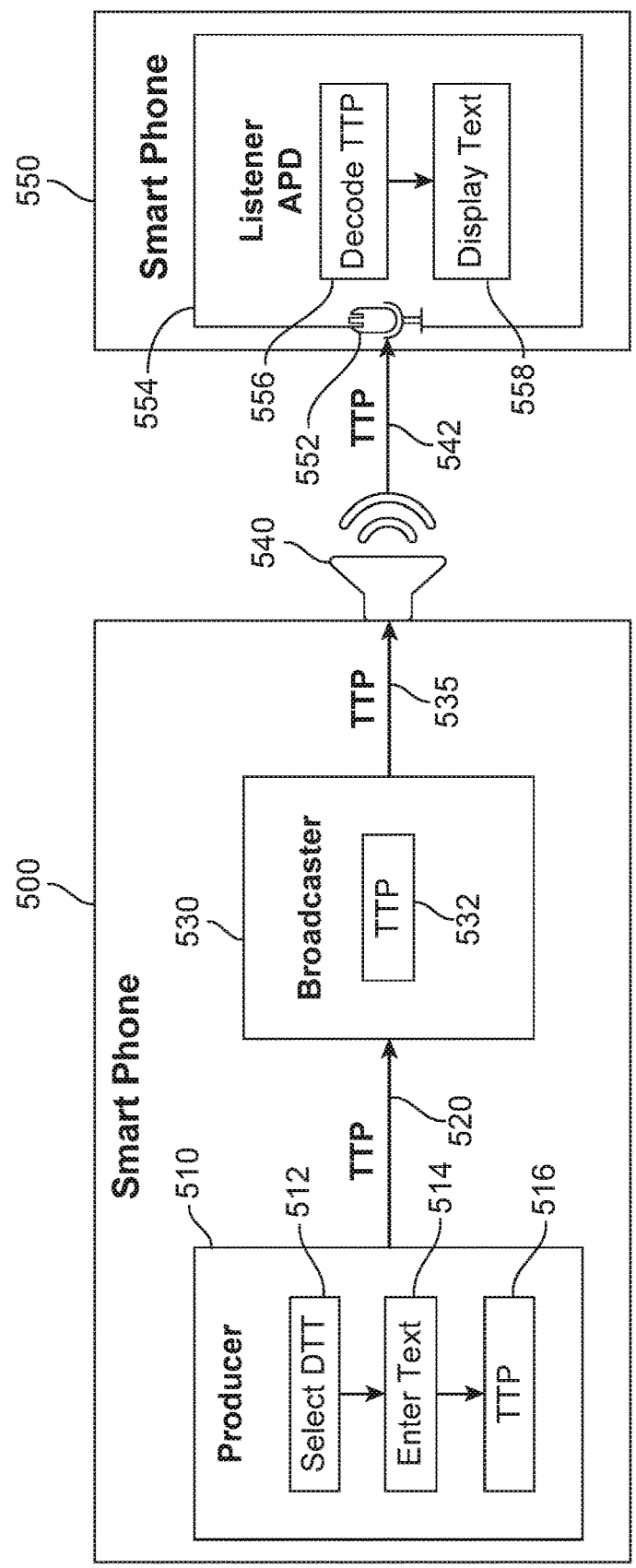
FIG. 5 shows a block diagram illustrating an example of a first mobile device encoding text to audio and an example of a second mobile device decoding audio to text.

Referring to FIG. 5, at step 510, the producer smartphone 500 or other audio encoding device, selects Direct Text Tone (DTT) 512.

At step 514, the producer enters text manually or the text may be automatically entered by using another program that accesses the direct text function.

At step 516, the producer creates one or more tone tip media production files for direct text tone processing. The unique reference code, containing text content, is automatically generated.

At step 520, the producer sends one or more tone tip media production files to broadcaster 530.

At step 532, the broadcaster receives one more tone tip media production files.

At step 535, the broadcaster sends one or more tone tip media production files to the audio signal processing device speaker.

At step 540, the broadcaster sends one or more tone tip media production files to audio signal processing devices 542 using Radio or audio signals.

At step 550, the audio signal processing device receives at least one tone tip media production file using audio 552 or radio signals.

At step 554, the audio signal processing device 556 decodes and processes the tone tip media production file.

At step 558, the audio signal processing device displays the decoded text.

Direct text may also be used to send text between one smartphone or tablet computer and one or more smartphones or tablet computers, using audio signals. Decoding is more successful when audio receiving devices are in close proximity to the audio source since audio signals attenuate quickly. The process is illustrated in FIG. 5. Processing is the same as shown in FIG. 4. The main differentiation is that the Smart Phone may be both the producer and broadcaster.

The producer and broadcaster may be a smartphone or tablet computer 500). The producer may select direct text 512 encoding. Part of the selection may include selecting the transmission method, such as Audio Frequency (AF) or Bluetooth options. The producer may also select high, medium, and low frequency audio frequency encoding or other encoding method selection. The producer may select all encoding types and receive a tone tip media production file for each encoding type. The text to be sent may then be entered into the producer interface 514. Shorter text messages may produce a tone tip media production file of shorter duration while longer messages may benefit from having a longer duration. After entering text, the tone tip media production file 516 may be produced. The unique reference code may be created as part of this process. The unique reference code format may follow the sequence shown where there's a command, optional delimiter, followed by a value and possible options. In the case of text message transmission, the command may be a text message, or specific text data such as a phone number, GPS location, web site URL, phone command, or other categorized text data.

One or more tone tip media production files may be sent to the broadcaster 520. The broadcaster may immediately send tone tip media production files 532 or store for later use. The broadcaster may send the tone tip media production file to one or more audio signal processing devices 540). The tone tip media production file may be sent as AF 542), or Bluetooth. The tone tip media production file is received using a microphone 552 by the audio signal processing device 554 and the unique reference code may be decoded by the audio signal processing device 556. The unique reference code may contain the Text Message command as well as the text message. The text message 558 may be displayed after decoding.

Tone Link Processing

Figure 6:
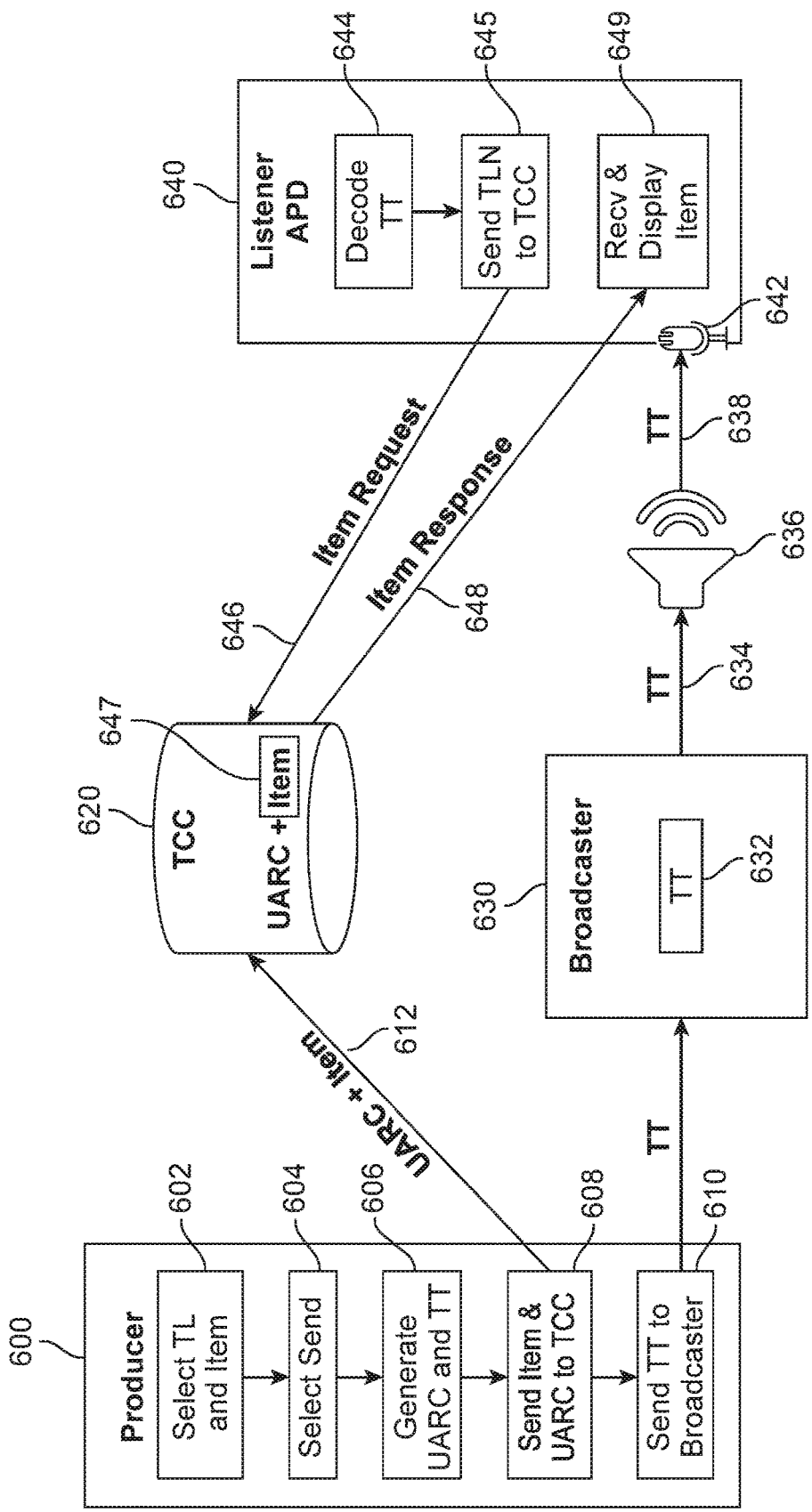
FIG. 6 shows a block diagram illustrating an example of a method to send a link to a digital item to one or more audio signal processing devices.

Referring to FIG. 6, at step 600, the producer selects Tone Link (TL) and a file item 602. The item may be a text message, link, photo, video, web site, or a computer (digital) file.

At step 604, the producer selects a command to send the selected item.

At step 606, producer automatically generates a tone unique reference code and a tone tip audio file.

At step 608, the producer sends the unique reference code and item to tone command database 612

At step 647, the tone command database stores the unique reference code and item in tone command database 620

At step 610, the producer sends one or more tone tip audio files to broadcaster.

At step 630, the broadcaster may immediately use or store tone tip flies 632.

At step 634, the broadcaster broadcasts one or more tone tips using radio or audio signals.

At step 636, the broadcaster sends audio signal to audio signal processing device 638

At step 640, the audio signal processing device receives 642 and decodes at least one tone tip 644 and obtains the unique reference code.

At step 645, the audio signal processing device sends unique reference code to tone command database.

At step 646, the item request message is received by the tone command data base.

At step 647, the tone command data base receives the unique reference code and correlates it with the original item in the tone command database At step 648, the tone command database sends the item to the audio signal processing device.

At step 649, audio signal processing device displays the items or completes the requested command. The audio signal processing device may also store the time stamped item in a history list.

Tone links may send links to text messages, photos, videos, phone numbers, business cards, documents, and any other file item from a producer to one or more audio signal processing devices. The purpose is to send one item from a producer to one or more audio signal processing devices. The difference between tone text and tone link is that tone text sends the content of the message as part of the unique reference code, where tone link send may send a unique reference code link to the content and the content may be stored on a Tone Command Center (TCC) data server or other location.

The producer 600 may be any computing device such as a smart phone, laptop, desktop computer, or network computer. The producer may also be a computer program, running on a computing device. The producer and broadcaster may be one device, such as a smart phone, desktop laptop or network computer. The producer may be connected to the tone command database 612 through the Internet, cell phone network or other network. After the tone link computer program is started, the producer may select the item to be broadcast 602. After selecting the item to be broadcast, the producer may send the item to the broadcaster 604. A unique reference code may be generated along with an audio tone tip file that contains the encoded unique reference code 606. In order to distinguish from other reference codes, the unique reference code may contain a producer identification code, producer metadata, encoding time, and an item code to produce a unique reference code. The unique reference code, metadata, and Item may be sent to the tone command center 608. The Tone Command Center (TCC) database 620 may store the unique reference code, metadata, and the item 647. The producer may send one or more tone tips to the broadcaster 610.

The broadcaster 630 may transmit one or more tone tips 632 to one more Listeners 634. The receiver 636 converts the broadcast signal into audio 638 for detection by the audio signal processing device 640. The producer may generate one or more tone tip Productions (composite signals) and send them to several broadcasters for distribution. The broadcaster may use RF such as a radio or TV, or use audio frequency, such as a public address system, computer, smart phone or tablet computer. The broadcaster may be separate from the producer or they may be combined into one device. The producer and broadcaster may also be combined into one device such as a smart phone or tablet computer. Producer and broadcaster personnel may physically be at one location like a TV or radio station.

The Listener audio signal processing device 640 may receive the audio 642 and decode at least one tone tip 644 into a unique reference code 645. The reference code 645 may be sent 646 to the tone command database to request the item associated with the reference code. The tone command database may receive the unique reference code and request the corresponding item 647. The tone command database may send the item to the audio signal processing device 648. The audio signal processing device may receive and display or process the item 649.

Public Address System Processing

Figure 7:
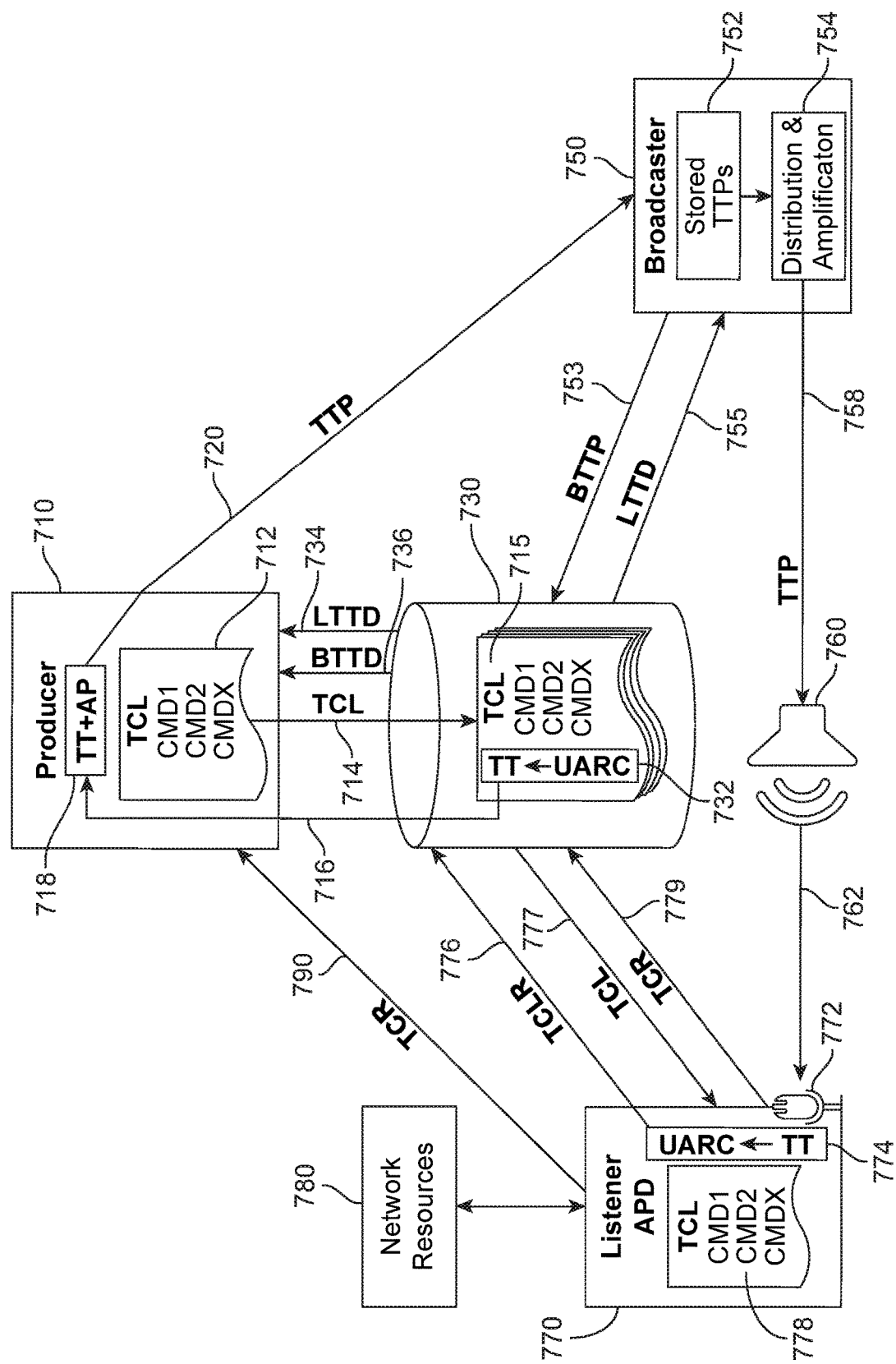
FIG. 7 shows a block diagram illustrating an example of a method to use a public address system to process tone tips.

Referring to FIG. 7, at step 710, the producer may complete a tone command list 712.

At step 714, the producer may send the tone command list to a data-base server for the tone command database.

At step 730, the tone command database server may receive the completed tone command list 715 from the producer and store the associated data and commands.

At step 732, the tone command database server may create a unique reference code for each new tone command list received. The tone command database server may send the tone command list 778 to the listener APD 770 for storage on an internal data storage device in advance of the transmission of a tone tip.

At step 732, the tone command database server may encode a unique reference code into one or more tone tip audio files (code signals).

At step 716, the tone command database server may send one or more tone tip audio files and optional metadata to the producer. The producer may receive these as audio files or as links to audio files.

At step 718, the producer may insert or merge one or more tone tip audio files into an Audio Production (AP) file, as an audio base signal, to create a tone tip media Production (TTP) file as a composite signal. The producer may also insert the unique reference code and metadata into the tone tip media production file metadata.

At step 720, the producer may send one or more tone tip media production files to one or more broadcasters.

At step 750, the broadcaster may receive tone tip media production files from the producer and stores it for later use 752 or uses it immediately.

At step 754, the broadcaster may send the tone tip media production file to audio signal processing devices through audio distribution system 758, which may include a speaker 760 that converts the audio signal to sound 762.

At step 753, the broadcaster may send broadcaster tone tip metadata to the tone command database 730.

At step 770, the audio signal processing device may receive at least one tone tip media production file audio file 772.

At step 774, the audio signal processing device may decode at least one unique reference code from the tone tip media production file.

At step 776, the audio signal processing device may send a Tone Command List Request (TCLR) to the tone command database server 730. The tone command database server may receive the data retrieval request and may retrieve the tone command list 715 associated with the unique reference code.

At step 777, the tone command database server may send the tone command list to the audio signal processing device 770.

At step 778, the audio signal processing device may receive and display the tone command list from the tone command database server, the internal database of the audio signal processing device, or may process an instant action message. The audio signal processing device may store the time stamped tone command list in a history list.

At step 734, the producer may receive broadcaster Tone Tip Data (BTTD).

At step 736, the producer may receive Listener Tone Tip Data (LTTD).

At step 755, the broadcaster may receive Listener Tone Tip Data (LTTD).

If a command is selected at the audio signal processing device, then at step 779, the audio signal processing device may send a Tone Command Response (TCR) to the tone command database server 730.

At step 770, the audio signal processing device may process the tone command as requested.

At step 780, the audio signal processing device may use other network resources as appropriate to complete tone command actions.

At step 790, the audio signal processing device may send the user request message data to the producer if requested by the producer.

Instant Action Commands

Instant action commands may be processed immediately by the audio signal processing device. The sequence may use the steps above to process the tone command response at step 779 automatically (without listener interaction).

The tone tip Public Address System application FIG. 7 focuses on forms of electronic sound amplification and distribution systems including sound reinforcement systems, paging systems, and "PA over IP".

The primary difference between PA and Radio/TV applications is the broadcast and distribution method. Radio broadcasting usually sends signals to a much larger audience, spread over a large geographic area ranging from small towns, to countries, continents, and in some cases, the entire world. Public address systems are usually focused on smaller groups in small areas such as a bus, airplane, ship, train, building, stadium, or campus. PA systems distribute signals though sound amplification and distribution systems, where radio uses RF amplification and distribution systems.

The Public Address application may start with the producer 710. The producer may be any computing device such as a smart phone, laptop, desktop or network computer. The producer may also be a computer program, running on a computing device. The producer may be connected to the tone command database through the Internet, cell phone or other network.

After the tone tip computer program is started, the producer may complete the tone command list 712. The producer may select images, commands, values, and options for each tone command. The producer may have the option to select the broadcast environment. The broadcast environment may be vastly different in a train versus an open stadium. The tone command list may be comprised of one or more Tone Commands. There may also be tone command list optional items such as photos, a header, footer, history, back/forward buttons and other navigation and display elements. The tone command list may also include producer and content metadata.

The tone command list may be sent to the tone command database server at step 714 where it is stored in tone command database 715. The tone command database may assign a Unique Action Reference Code 732. The unique reference code may contain the unique tone command database file code assigned to the tone command list. One or more audio tone tips (TT) may be generated from each unique reference code. The tone command database may generate more than one tone tip to allow the producer to select the tone tip that is most appropriate for the media environment used to deliver the tone tip media production file. The tone tip and optional metadata may be sent to the producer 716.

The producer may add one or more tone tip audio files and metadata to the Audio Production (AP) file 718 to form the Tone Tip Production (TTP) file. The producer may send the tone tip media production file to one or more broadcasters 720.

The broadcaster may receive the tone tip media production file 750. The tone tip media production file 752 may be used immediately or stored for later use. The distribution and amplification system 754 may send tone tip media production file audio to one or more speakers or headset 760. The tone tip media production file audio from the speakers or headset 762 may be received by one or more audio signal processing devices 772. The broadcaster may send Broadcaster Tone Tip Data (BTTD) 753 to the tone command database. Broadcaster tone tip data may support system data analysis, reporting, listeners back channel processing.

The audio signal processing device may request Back Channel Processing when a tone tip is detected, but decoding is incomplete or invalid. The audio signal processing device may use historical data retrieval request information and tone command database resources to determine what broadcaster sent the last valid tone tip to the audio signal processing device. If the current invalid tone tip reception time matches the broadcaster tone tip data reception time from the last tone tip media production file Broadcast, then the tone command center may provide the most current tone command list from the broadcaster to the audio signal processing device. The technique may be called Back Channel Processing because it uses back end network channels and historical data rather than the primary audio channel.

The Listener Audio signal Processing Device 770 may receive the audio and decode the tone tip into the unique reference code 774. If the code-associated data is stored on the internal data storage device of the audio signal processing device, the unique reference code may be used to lookup the tone command list located in the internal database of the APD. If the code-associated data is not stored on the internal data storage device of the audio signal processing device, the unique reference code may be sent to the tone command database server to request the tone command list as a Tone Command List Request (TCLR) 776. The tone command database server may receive the unique reference code and correlate the unique reference code with the code-associated tone command list 715.

The tone command database server may send the tone command list to the audio signal processing device 777. The audio signal processing device may receive and display the tone command list 778. The Listener may take action on the tone command list, or ignore the tone command list. If action is taken on the tone command list, the tone command list may be processed by the audio signal processing device. The audio signal processing device may use other network resources 780 to process a command requiring external resources, such as calling a phone, retrieving a map, or displaying a website. A Tone Command Response (TCR) may be sent to the tone command database server at step 779. A user request message may also be sent to the producer 790. The broadcaster may request Listener Tone Tip Data (LTTD) 755. The producer may request Listener Tone Tip Data (LTTD) 734 or Broadcaster Tone Tip Data (LTTD) 736 from the tone command database 730.

Figure 9:
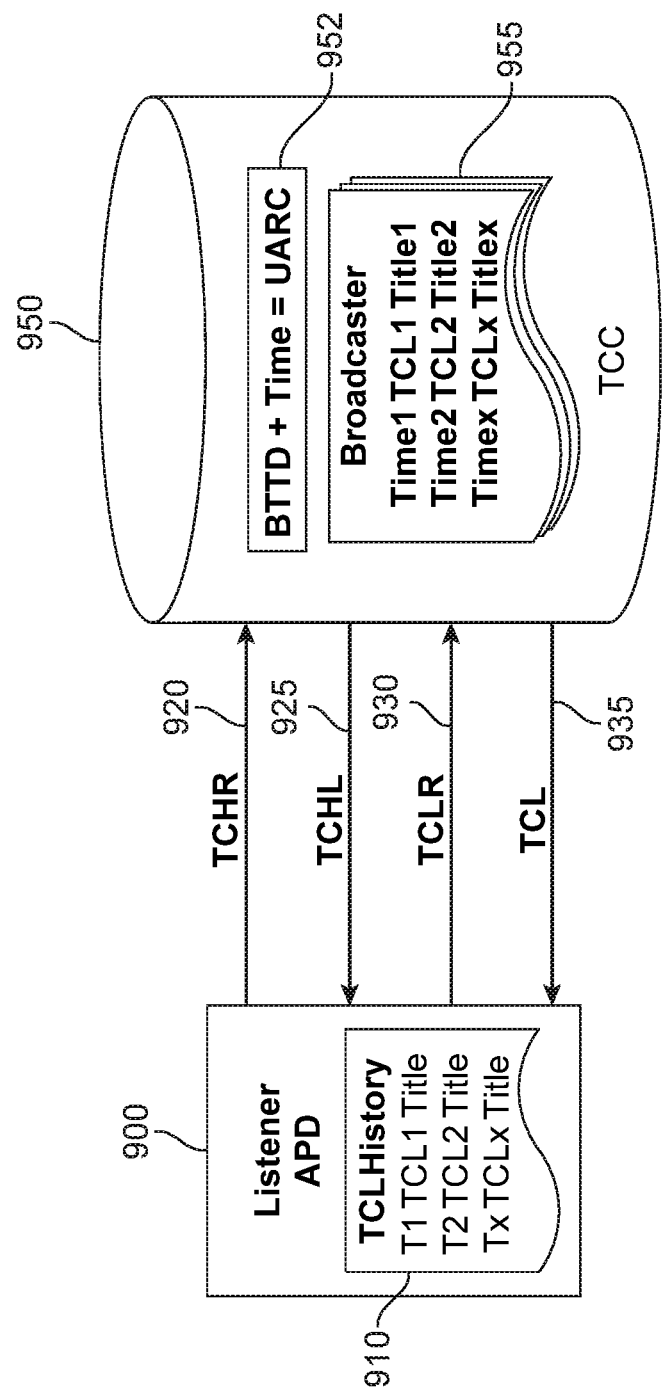
FIG. 9 shows a block diagram illustrating an example of a method to process and display historical tone tip information.
Figure 10:
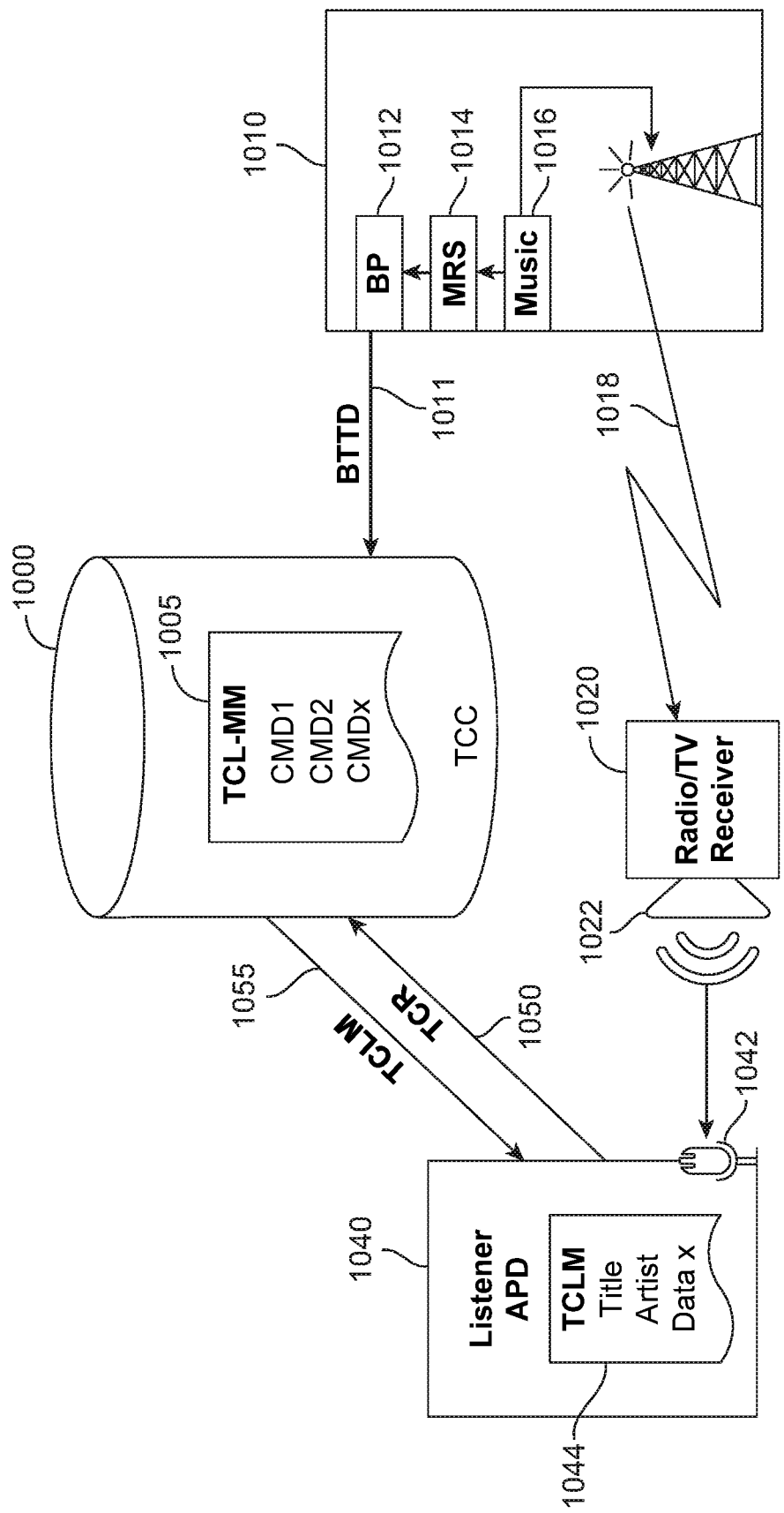
FIG. 10 shows a block diagram illustrating an example of a method to process and display music related information.
Figure 11:
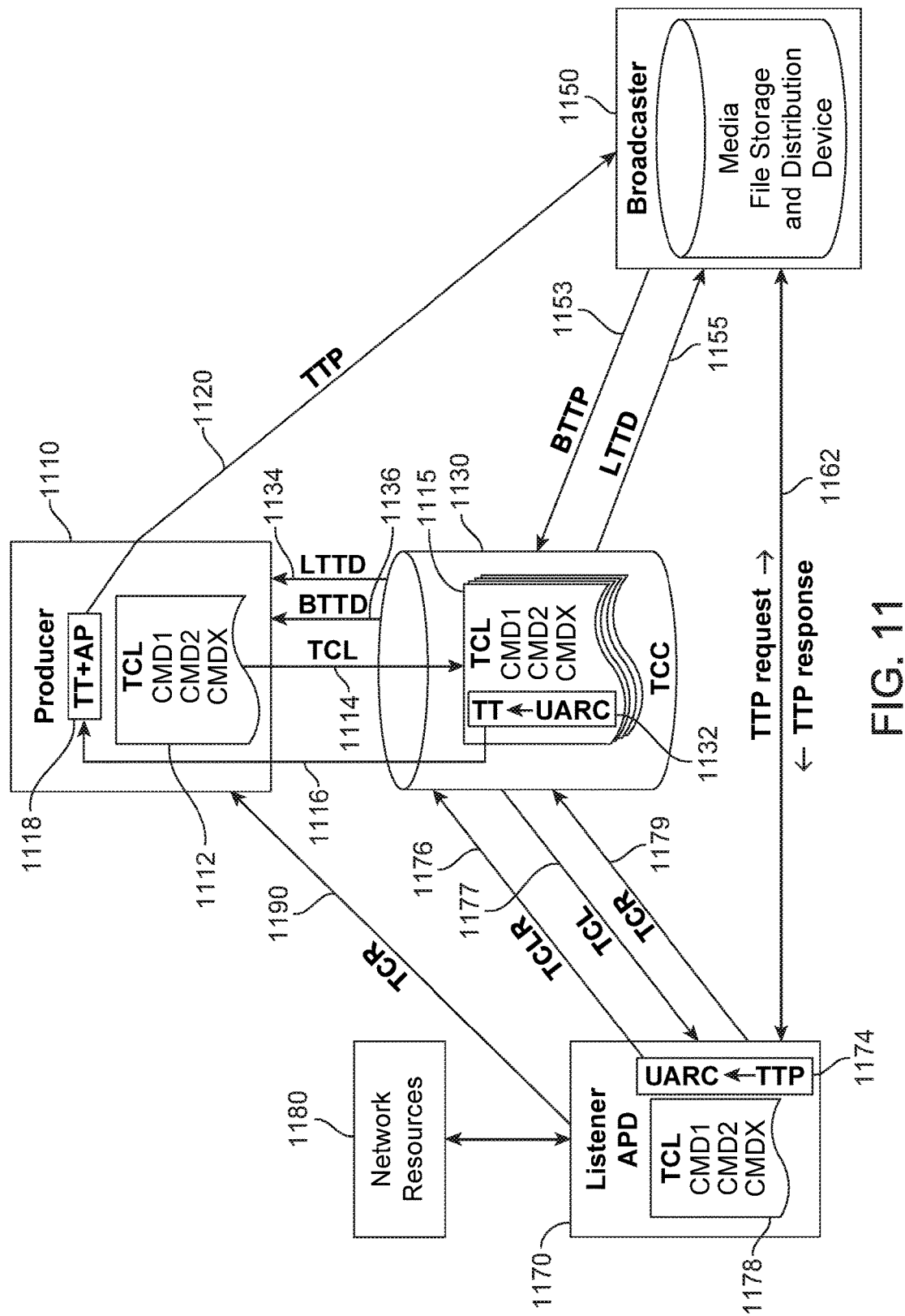
FIG. 11 shows a block diagram illustrating an example of a method to use Internet systems to process tone tips.

The audio signal processing device may request Back Channel Processing when a tone tip is detected, but decoding is incomplete or invalid. The audio signal processing device may use historical data retrieval request and tone command database resources to determine what broadcaster sent the last valid tone tip to the audio signal processing device. If the current invalid tone tip reception time matches the broadcaster tone tip data reception time from the last tone tip media production file Broadcast, then the tone command center may send the most current tone command list from the broadcaster to the audio signal processing device. The technique may be called Back Channel Processing because it uses back end network channels and historical data rather than the primary audio channel. It may also be used to send unique reference code data to an audio signal processing device when audio is not available or is of poor quality. See historical sequence diagram FIG. 9.

Figure 8:
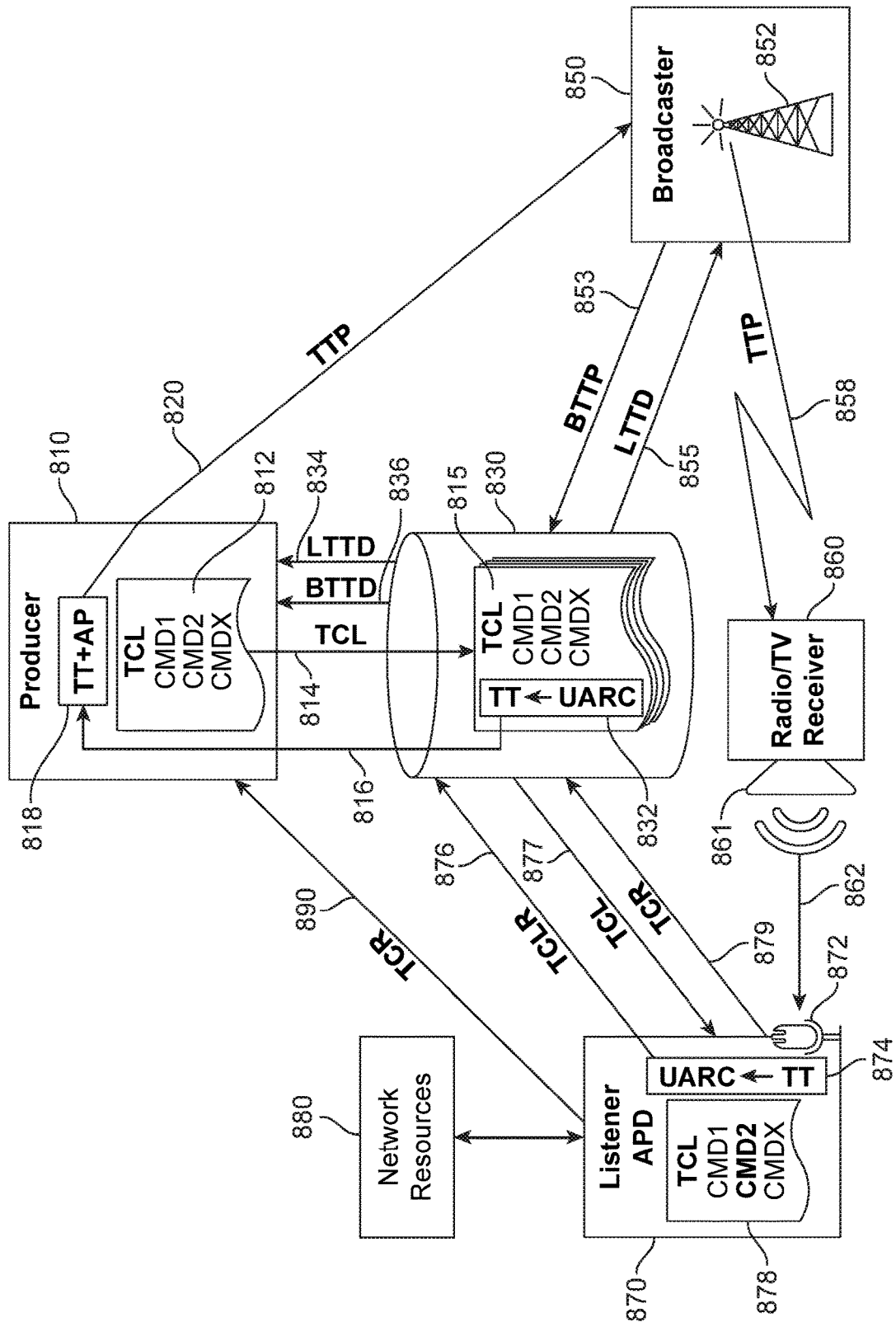
FIG. 8 shows a block diagram illustrating an example of a method to use a broadcast radio and TV systems to process tone tips.

Referring to FIG. 8, at step 812, the producer may complete the tone command list and send it to the tone command database server 830. The tone command list input may include one or more encoding method selections.

At step 814, the tone command database may receive the completed tone command list from the producer.

At step 815, the tone command database server may store the tone command list data on the tone command database.

At step 832, the tone command database server may create a Unique Action Request Code (UARC) or unique reference code for each new tone command list received.

At step 832, the tone command database server may encode the unique reference code into one or more tone tip audio files. The tone command database server may send the newly generated tone command list to one or more audio signal processing devices in advance of the transmission of any associated tone tips.

At step 816, the tone command database server may send one or more tone tip audio files to the producer.

At step 818, the producer may insert one or more tone tip files and optional metadata into a tone tip media production (TTP) file.

At step 820, the producer may send the tone tip media production file to one or more broadcasters. The broadcasters may include radio, TV, satellite, and cable broadcasters.

At step 850, the broadcaster may receive the tone tip media production file from producer.

At step 852, the broadcaster sends the tone tip media production file to radio and or TV receivers.

At step 853, the broadcaster may send Broadcast Tone Tip Data (BTTD) to the tone command database.

At step 860, a radio/TV signal receiver may receive the tone tip media production file from the broadcaster.

At step 862, the receiver may plays audio through speaker(s) or a headset.

At step 872, the audio signal processing device may receive at least one tone tip.

At step 874, the audio signal processing device may decode at least one tone tip into the associated unique reference code.

At step 876, the audio signal processing device may send a data retrieval request and device metadata to the tone command database server if the command list for the decoded code is not stored on the audio signal processing device. If the command list for the decoded code is stored on the audio signal processing device, the command list is retrieved without sending a request to the tone command database server.

At step 830, the tone command database server may receive audio-signal-processing-device-specific metadata and the data retrieval request. The tome command database server then may save audio signal processing device metadata, At step 815 the tone command database server may retrieve the tone command list associated with unique reference code.

At step 877, the tone command database may send the tone command list to the audio signal processing device.

At step 878, the audio signal processing device may receive and display the tone command list and save the list to the history list. If the device is listening in background mode, the tone command list may be saved to the device history list but may not display the list on the device until requested by the user.

At step 834, the producer may receive Broadcaster Tone Tip Data (BTTD) if the data is requested from the tone command database server.

At step 836, the producer receive may Listener Tone Tip Data (LTTD) if the data is requested from the tone command database server.

At step 855, the broadcaster may receive Listener Tone Tip Data (LTTD) if the data is requested from the tone command database server.

If a command is selected by the user (listener) at audio signal processing device, then the actions below may be processed.

At step 870, the audio signal processing device may process tone command actions as requested by the user.

At step 880, the audio signal processing device may use other network resources to complete a command action. The other network resources may include the telephone network to process a telephone call, the internet to request a web site, or other resource not associated with the tone command database.

At step 879, the audio signal processing device may send a tone Command Response (TCR) to the tone command database server, including audio-signal-processing-device data including data representative of an action taken by a user using an item in the displayed tone command list.

At step 890, the audio signal processing device may send user request message history data to the producer if requested by the producer.

Instant Action Commands

Instant action commands may be processed immediately by the audio signal processing device. The sequence may use the steps above but may process step 879 automatically (without listener interaction).

The tone tip broadcast application focuses on RF broadcasts including radio, TV, cable, and satellite communications.

The broadcast application may start with the producer. The producer may be any computing device such as a smart phone, laptop, desktop or network computer. The producer may also be a computer program, running on a computing device. The producer and broadcaster may be consolidated into one device.

After the tone tip computer program is started, the producer 810 may complete the tone command list 812. The producer may select commands, values, and options for each tone command. The producer may have the option to select the broadcast environment. The broadcast environment is different for AM radio verses FM radio, TV, cable and satellite. The tone command list may be comprised of one or more tone commands. There may also be tone command list optional items such as image, header, footer, history, back/forward buttons and other navigation and display elements. The tone command list may also include producer and content metadata.

The tone command list may be sent to the tone command database 830 where it is stored 815. The tone command database may assign a Unique Action Reference Code (UARC) 832 to the tone command list. The unique reference code may contain the unique tone command database file code assigned to the tone command list. One or more audio tone tips may be generated from the unique reference code. The tone command database may generate more than one tone tip to allow the producer to select the tone tip that is most appropriate for the media environment used to deliver the tone tip media production file. The tone tips and optional metadata may be sent to the producer 816. The producer may add one or more tone tip audio files and metadata to the audio production file 818 to produce the Tone Tip Production (TTP) file. The producer may send the tone tip media production file 820 to one or more broadcasters 850.

The broadcaster may receive the tone tip media production file 850. The tone tip media production file may be used immediately by the broadcaster or stored for later use. The tone tip media production file may be sent to one or more radio or TV receivers 852. Broadcaster Tone Tip Data (BTTD) 853 may be sent to the tone command database 810. Broadcaster tone tip data may support system data analysis, reporting and back channel processing.

A radio or TV signal receiver 860 may detect the RF signal and convert it back into audio 862 by outputting on a speaker 861 or headset, and send the audio to the audio signal processing device 872. The receiver 860 and audio listening device 870 may be considered to be a receiver assembly. The audio receiver may be contained within the Listeners audio signal processing device, such as a smartphone with a built in radio, or reception of Internet radio, or other Internet audio or video content, in which case the audio signal processing device functions as the receiver assembly.

The audio signal processing device 870 may receive the tone tip media production file and decode the tone tip into a unique reference code 874. The audio signal processing device then determines whether code-associated data in the form of a tone command list associated with the unique reference code is stored on the internal data storage device of the audio signal processing device. If the tone command list is stored on the internal data storage device, the unique reference code may be used to retrieve the tone command list from the internal data storage device on the audio signal processing device. In response to the decoding of the tone tip into the unique reference code, the audio signal processing device may send to the tone command database server audio-signal-processing-device-specific data, including a device unique identification number. If the tone command list associated with the unique reference code is not stored on the internal data storage device, the unique reference code, along with General Listener Data (GLD) may be sent to the tone command database server as a Tone Command List Request (TCRL) 876.

The tone command database server 830 may process the TCRL, use the unique reference code to reference the code-associated tone command list 815 and send the tone command list to the audio signal processing device 877. The tone command database server may also store audio signal processing device metadata (audio-signal-processing-device-specific data), the unique reference code, and broadcaster tone tip data. This data is used for real time and post event analysis.

After receiving the tone command list 878 from the internal data storage device or the tone command database server, the audio signal processing device may receive and display the tone command list 878. The Listener may take one or more actions associated with the tone command list. If one or more actions are taken, audio-signal-processing-device-specific data including a device unique reference number and a Tone Command Response (TCR) may be sent to the tone command database server 879 for every action on the displayed tone command list taken by the user. The audio signal processing device may use external network resources 880 to process a command requiring external resources, such as calling a phone, retrieving a map, or displaying a website. A user request message 890 may also be sent to the producer for every action taken on the audio signal processing device. The user request message may contain audio signal processing device metadata, unique reference code, and list of specific commands selected at the audio signal processing device.

The producer may request audio signal processing device data 834 and broadcaster tone tip data 836. This data may be used for analysis to determine listener response, tone tip media production file effectiveness, broadcaster effectiveness, and other information associated with broadcast media.

The broadcaster may request audio signal processing device data 855 and broadcaster tone tip data to conduct real time and post event analysis. This analysis may be used to determine listener response, tone tip media production file effectiveness, broadcaster effectiveness, broadcaster coverage area and other information associated with broadcast media.

The audio signal processing device may request back channel processing when a tone tip is detected, but decoding is incomplete or invalid. Back channel processing may be when the audio signal processing device and uses a historical data retrieval request and tone command database resources to determine what broadcaster sent the last valid tone tip to the audio signal processing device. If the current invalid tone tip reception time matches the broadcaster tone tip data reception time from the last tone tip media production file broadcast, then the tone command center may send the most current tone command list from the broadcaster to the audio signal processing device. The technique may be called Back Channel Processing because it uses back end network channels and historical data rather than the primary audio channel. It may also be used to send unique reference code data to an audio signal processing device when audio is not available or is of poor quality. See historical sequence diagram illustrated in FIG. 9.

At step 900, the audio signal processing device may request broadcaster history. Broadcast history may include automatic history processing, history button, search, back channel processing or any history related action.

At step 920, the audio signal processing device may send TC History Request (TCHR) to the tone command database. The history request may contain time, broadcaster tone tip data and audio signal processing device metadata.

At step 950, the tone command database may correlate broadcaster tone tip data and time received to the unique reference code 952.

At step 955, the tone command database may build a TC History List (TCHL).

At step 925, the tone command database may send history list to the audio signal processing device.

At step 910, the audio signal processing device may display the history list.

If a command is selected by a user (listener) at audio signal processing device, then processing may continue with the steps below.

At step 930, the audio signal processing device may send a data retrieval request to the tone command database.

At step 950, the tone command database may receive and processes the data retrieval request.

At step 935, the tone command database may send the requested tone command list to audio signal processing device and audio signal processing device may display the tone command list. The listener may take action using the audio signal processing device by selecting one or more of the commands.

A listener may hear information on the radio, TV or Internet that includes a tone tip, but doesn't have the tone tip application running at the time. Tone tip history processing may allow the audio signal processing device to retrieve, view, and act upon tone tips previously sent from broadcasters. The audio signal processing device may access broadcaster history using automatic or manually methods.

If automatic history is enabled, the audio signal processing device may automatically receive broadcaster history data whenever a valid tone tip is received. After one tone tip is received from a broadcaster, the broadcaster may be identified by the audio signal processing device if the tone command list contains the broadcaster ID as part of the tone command list or broadcaster tone tip data is received by the tone command database. After the broadcaster is identified by the tone command database, historical tone command list data may be retrieved from the tone command database to build the TCHL. The TCHL may be then sent to the audio signal processing device.

Manual history may also be used when the audio signal processing device initiates a history search routine. A listener may initiate manually processing using the audio signal processing device when a broadcaster is selected from a previous history list or as the result of a search routine.

The listener may select automatic history processing from the audio signal processing device or manually initiate a history related search on the audio signal processing device 900. The history related interface may include history navigation buttons, history screens, and search routines. The audio signal processing device may send a Tone Command History Request (TCHR) to the tone command database 920. The history request may include audio signal processing device metadata, broadcaster ID, date and time. This data may be used by the tone command database 950 to look up the unique reference code for a broadcaster 952 at a specific time.

A Broadcaster Tone Command History List (TCHL) may be developed 955 and sent to the audio signal processing device 925. The tone command list may be displayed by the audio signal processing device 910. Time x represents the time that tone command list x was sent by the broadcaster. Title x represents the title or heading of tone command list x. Other tone command list commands, navigation and display elements may also appear in the TCHL. If the Listener responds to the TCHL and selects a command from the tone command list on the audio signal processing device, a data retrieval request may be sent to the tone command database 930. The tone command database may receive the data retrieval request and send the tone command list to the audio signal processing device 935. The audio signal processing device may display the tone command list.

At step 1016, the broadcaster may play music.

At step 1018, the broadcaster may transmit music to radio or TV receivers.

At step 1014, the broadcaster music may be received and processed by the Music Recognition System (MRS).

At step 1014, the broadcaster music recognition system may retrieve music metadata from music file being played or broadcaster music recognition system uses external services such as Gracenote, Shizam, or Soundhound to recognize music, title, artist and other metadata.

At step 1012, the broadcast processor may receive music metadata, add it to broadcaster tone tip data 1011 and send it to the tone command database.

At step 1000, the tone command database may receive and record broadcaster tone tip data as part of broadcaster history 1005.

At step 1020, music may be received by the radio or TV signal receiver. The music may then be output on a speaker 1022 to the audio signal processing device 1040. This may occur any time after step 1018.

At step 1042, music may be received on a microphone in the audio signal processing device and the audio signal processing device synchronizes with the broadcaster to receive music metadata.

At step 1055, the tone command database may send the Tone Command List Music data (TCLM) to the audio signal processing device.

At step 1040, the audio signal processing device may receive music data.

At step 1044, the audio signal processing device may display music data.

At step 1050, if the user (listener) may take action at the audio signal processing device, a Tone Command Response (TCR) may be sent to the tone command database and the commands may be processed by the audio signal processing device as a broadcast application command as described in the broadcast application.

Tone Command List Music data (TCLM) may provide a method for the audio signal processing device to display music data that was played by the broadcaster. The music data may be displayed in sequence, as with other tone command lists, and may also be displayed in the broadcaster history list.

Music metadata may include artist, title, genre, year and other music metadata commonly referred to as ID3 or ISRC. Other data may be added to the music data including band videos, artist schedules, artist store, news, web sites, and other information. Services may be available that recognize music being played on radio stations, TV stations, and elsewhere. Current services include Gracenote, SoundHound, Shizam, and others. Music data may use the data output of music recognition software or service if the broadcast audio does not include music metadata. Music recognition may be accomplished by the broadcaster, audio signal processing device, or the tone command database.

A radio or TV station 1010 may play music 1016 and it may be transmitted to radio or TV receivers 1018. The music may be received by the receivers 1020. The music is output on at least one speaker 1022 or headset and received by the microphone 1042 of one or more audio signal processing devices 1040. Music may be received by the music recognition system 1014. If it's received as a music file, music metadata may be extracted and sent to the Broadcast Processor (BP) 1012. If file metadata is not available, a music recognition service such as Gracenote, SoundHound, or Shizam may be used to receive music metadata. Music metadata may be sent as part of broadcaster tone tip data to the tone command database 1011. Broadcaster tone tip data may include music metadata, broadcaster ID, time, and other broadcaster metadata.

The tone command database may send the Tone Command List Music data 1005 (TCLM) to the audio signal processing device 1055. The music data may be displayed in sequence, as with other tone command lists 1044. If action is taken by the Listener, a Tone Command Response (TCR) may be sent to the tone command database 1050 and the command may be processed. Commands may be processed by the audio signal processing device as a described in the broadcast application section.

At step 1110, the producer may complete the tone command list 1112 and send it to the tone command database 1114.

At step 1115, the tone command database may receive the completed tone command list from producer and stores the data. The tone command list input includes one or more encoding method selections.

At step 1132, the tone command database may create a unique reference code for each new tone command list received, encode unique reference code into one or more tone tip audio files and produce one or more metadata files. The tone command database may send the tone command list to the internal database on the internal data storage device of one or more audio signal processing device.

At step 1116, the tone command database may send at least one tone tip audio file, unique reference code to the producer. The tone command center may also send metadata file to the producer.

At step 1118, the producer may insert one or more tone tip files into an audio or video production file (audio, video, presentation, or other computer file). The producer may also insert metadata into the tone tip media production file.

At step 1120, the producer may send the tone tip media production file to a file or web server to act as the tone tip media production file distribution device (broadcaster).

At step 1150, the broadcaster may receive the tone tip media production file from the producer.

At step 1162*a*, the audio signal processing device may request the tone tip media production file from broadcaster. This step is not applicable if the audio signal processing device may receive files automatically.

At step 1162*b*, the broadcaster may send tone tip media production file to audio signal processing device as requested (i.e. YouTube, Vimeo, Pandora, email, etc.).

At step 1153, the broadcaster may send broadcaster tone tip data to the tone command database.

At step 1170, the audio signal processing device may receive and decode the unique reference code 1174 from tone tip media production audio file or metadata file. The audio signal processing device may determine whether the tone command list associated with the unique reference code is stored on the internal data storage device of the audio signal processing device. If the tone command list is stored on the internal database, the audio signal processing device may use the unique reference code to look up the tone command list from the internal database of the audio signal processing device.

At step 1176, if the tone command list is not stored on the internal database, the audio signal processing device may send a Tone Command List Request (TCLR) to the tone command database. The list request may contain the unique reference code and device metadata in the form of audio-signal-processing-device-specific data, including a device unique identification number.

At step 1130, the tone command database receives the data retrieval request, saves the audio signal processing device metadata, and retrieves the tone command list associated with the unique reference code At step 1177, the tone command database may send the tone command list to audio signal processing device. Thus, the tone command list may be retrieved from the internal database, or from the external, remote tone command database.

At step 1178, the audio signal processing device may receive and display the tone command list and save the tone command list to the device history list. If the user has selected background mode, the tone command list may be saved to the device history list without actively displaying the list until requested by the user. If a command is selected by the user at audio signal processing device, then the following steps may be processed.

At step 1179, the audio signal processing device may process the tone command as requested by the user and send a Tone Command Response (TCR) to the tone command database along with device metadata (audio-signal-processing-device-specific data) including data representative of the action taken by the user.

At step 1180, the audio signal processing device may use other network services to complete command action selected by the user.

At step 1190, the audio signal processing device may send a user request history message to producer if the producer requested user request history.

At step 1134, the producer may receive Listener Tone Tip Data (LTTD) if the data is requested from the tone command database.

At step 1136, the producer may receive Broadcaster Tone Tip Data (BTTD) if the data is requested from the tone command database.

At step 1155, the broadcaster may receive audio signal processing device data if the data is requested from the tone command database.

The tone tip static application focuses on static media files that are stored on network servers, computers, and independent storage devices. Network servers include Internet media distribution servers such as YouTube, Pandora, Vimeo, NetFlix and network broadcasters. Independent storage devices may include individual computer file storage devices such as hard drives, solid state drives, and USB drives. Media files include audio, video, and presentation files.

The static file application may start with the producer 1110. The producer may be any computing device. The producer may also be a computer program, running on a computing device. The producer and broadcaster may be consolidated into one device. After the tone tip computer program is started, the producer may complete the tone command list 1112. The producer may select commands, values, and options for each tone command. The producer may also select tone command list optional items such as a header, footer, history, back/forward buttons and other navigation and display elements. The tone command list may also include producer and content metadata.

The tone command list 1114 may be sent to the tone command database 1130 where it is stored. The tone command database may assign a Unique Action Reference Code (UARC) 1132. The unique reference code may contain a unique tone command database file code assigned to the tone command list. An audio tone tip file may be generated from the unique reference code 1132. The tone tip and metadata 1116 may be sent to the producer.

The producer may add the tone tip audio and metadata to the Audio Production (AP) file 1118 to form the Tone Tip Production (TTP) file. The producer may send the tone tip media production file 1120 to one or more broadcasters 1150.

The broadcaster 1150 may receive the tone tip media production file 1120. The tone tip media production file may be stored for later use. The audio signal processing device may request a tone tip media production file from a broadcaster 1162a or receive the tone tip media production file independently from another source such an email or separate audio or video tone tip media production file. The tone tip media production file may be sent to one or more audio signal processing device 1162b as requested by the audio signal processing device. Broadcaster Tone Tip Data (BTTD) may be sent to the tone command database 1153. Broadcaster tone tip Data is broadcaster metadata that may contain tone tip transmit time and date, station identification, producer information, advertiser and other broadcaster metadata.

The audio signal processing device may receive the tone tip media production file and decodes the tone tip into the unique reference code or extract the unique reference code from the metadata 1174. The unique reference code along with General Listener Data (GLD) may be sent to the tone command database as a Tone Command List Request (TCLR) 1176. Audio signal processing device metadata 1155 may be sent to the broadcaster 1150.

The tone command database may process the tone command list request, use the unique reference code to reference the tone command list 1112 and return the tone command list to the audio signal processing device 1177. The tone command database may also store audio signal processing device metadata, unique reference code, and broadcaster tone tip data. This may be used for real time and post event analysis.

The audio signal processing device may receive and display the tone command list 1178. The Listener may now take one or more actions associated with the tone command list. If one or more actions are taken, a Tone Command Response (TCR) may be sent to the tone command database for every action 1179 with an option to send a user request message to the producer 1190. The user request message may contain audio signal processing device metadata, unique reference code, and list of specific commands selected at the audio signal processing device.

The producer may request audio signal processing device data 1134 and broadcaster tone tip data 1136 to conduct real time and post event analysis. This analysis may be used to determine listener response, tone tip media production file effectiveness, broadcaster effectiveness, and other information associated with the tone tip media production file.

The broadcaster may request audio signal processing device 1155. This data may be used for analysis to determine listener response, tone tip media production file effectiveness, broadcaster effectiveness, broadcaster coverage area and other information associated with the tone tip media production file.

The steps below may be completed before disconnecting from the tone command center.

At step 1210, the producer may complete the tone command list 1212.

At step 1214, the producer may send the tone command list to the tone command database.

At step 1215, the tone command database may receive the tone command list from the producer and store the data.

At step 1232, the tone command database may create a unique reference code for each new tone command list received and encode a unique reference code into one or more tone tip audio files.

At step 1216, the tone command database may send one or more tone tip audio files and the unique reference code to the producer.

At step 1218, the producer may insert a tone tip into tone tip media production file. The producer may also insert metadata into the media production file.

At step 1220, the producer may send tone tip media production files and metadata to the onboard platform tone command database. The tone command database may send the tone command list to the internal database of one or more audio signal processing devices.

At step 1250, the platform tone command database may store tone tip media production files and metadata.

Platform Underway (Disconnected from Internet)

At step 1250, the broadcaster may send tone tip media production files to one or more audio signal processing devices through a public address system 1260 or media distribution system 1262.

At step 1272, the audio signal processing device may receive the media production file.

At step 1284 the audio signal processing device may decode the unique reference code from the tone tip media production file or from the file metadata.

At step 1264, the audio signal processing device may send a Tone Command List Request (TCLR) to the platform tone command database.

At step 1252, the platform tone command database may receive a data retrieval request, save audio signal processing device metadata, and retrieve the tone command list associated with unique reference code.

At step 1266, the platform tone command database may send a tone command list to the audio signal processing device.

At step 1282, the audio signal processing device may receive and displays tone command list from the platform tone command database and record the tone command to the history list. If the user has selected background mode, the audio signal processing device may record the tone command list in the history list and may display the tone command list when requested by the user.

If a command is selected at the audio signal processing device, then the steps below may be processed.

At step 1280, the audio signal processing device may process the tone command as requested.

At step 1268, the audio signal processing device may send a user request message to the platform tone command database if external action is involved.

At step 1250, the platform tone command database may process the user request message from the audio signal processing device.

Response actions and services may be performed by the platform tone command database.

At step 1254 the platform tone command database may build the tone command action response.

At step 1270, the tone command database may send a Tone Command Action Response (TCAR) to the audio signal processing device.

At step 1280, the audio signal processing device may display the Tone Command Action Response (TCAR) and performs related actions.

Tone tip transportation mode is focused on transportation platforms such as trains, planes, automobiles, ships, and busses, specifically when they're disconnected from the Internet. Transportation platforms may use tone tips through the public address system or media distribution system for platform information, multi-lingual information, sales announcements, meal and snack ordering and general announcements. These are inherently noisy environments and present their own technical challenges in delivering the tone tip, unique reference code, and related tone command list information to listeners. The public address system, onboard entertainment system, and standalone wireless network, may be used to broadcast tone tip media production files to audio signal processing devices.

Since the Internet is not always available on transportation platforms, the broadcaster may act as the platform tone command database. Generally, the only tone command list and content information that would be available would be data that's stored or preloaded on the platform tone command database or linked audio signal processing devices. The broadcaster may plan to store all tone command list data and associated content that may be requested by audio signal processing devices. This may include all data that is displayed when a command is selected from a tone command list. The broadcaster may elect to have a platform unique audio signal processing device application to limit errors associated with data retrieval requests linked to off platform tone command lists.

Figure 12:
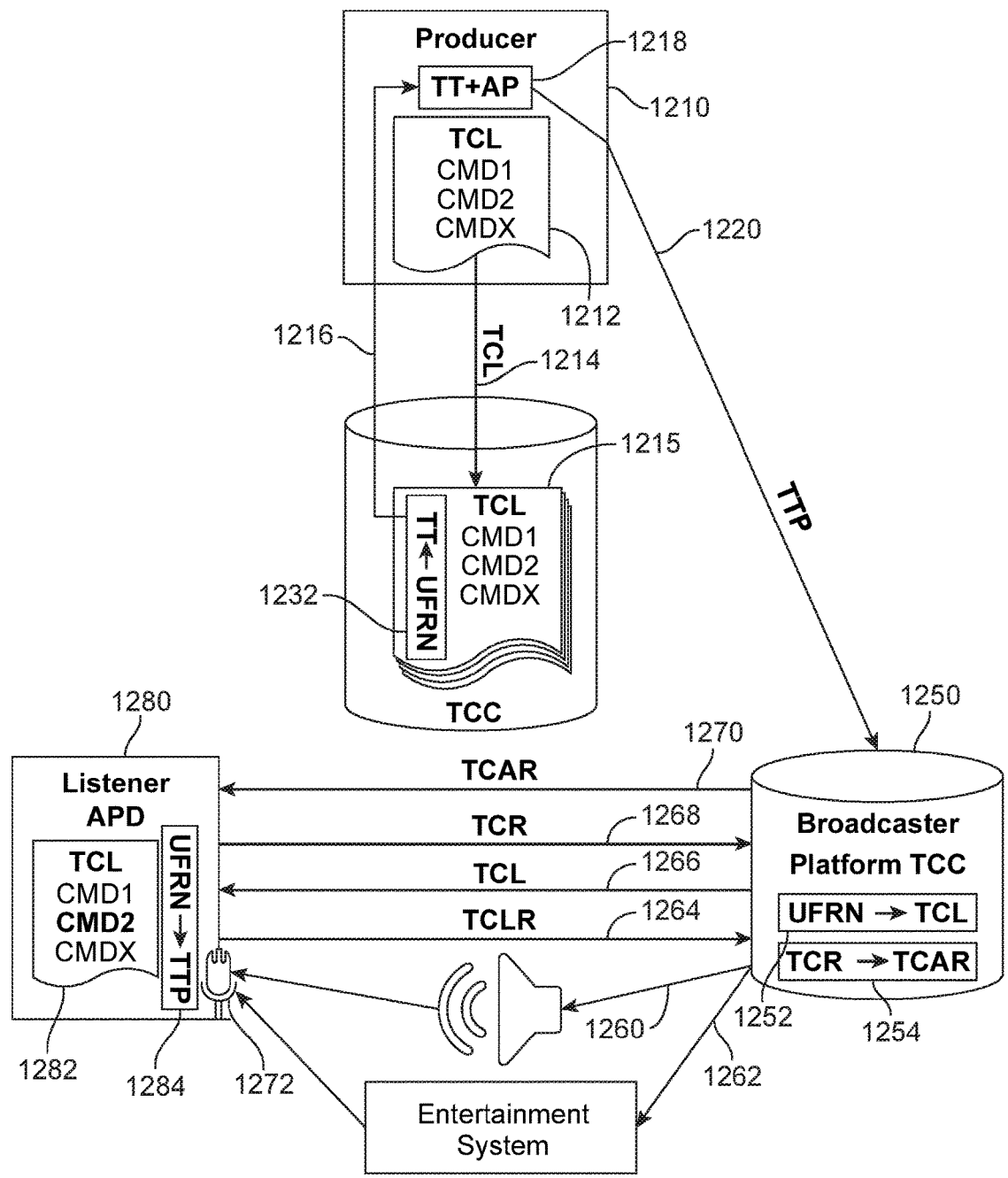
FIG. 12 shows a block diagram illustrating an example of a method to use standalone file storage systems to process tone tips.
Figure 13:
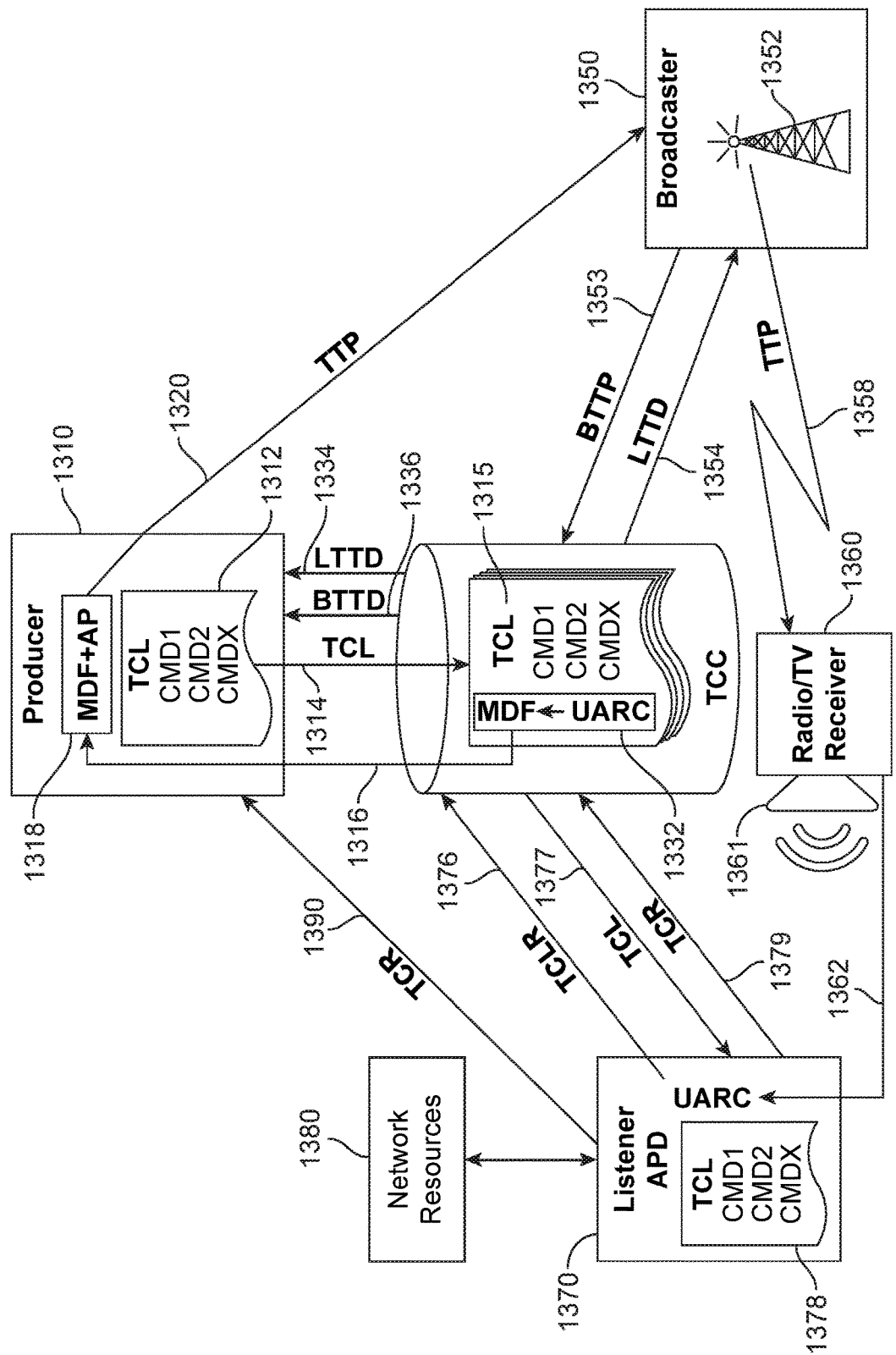
FIG. 13 shows a block diagram illustrating an example of a method to use Bluetooth communication to process tone tips.

As shown in FIG. 12, after the tone tip computer program is started, the producer 1210 may complete the Tone Command List (TCL) 1212. The producer may select the commands, values, and options for each tone command. The producer may also select tone command list optional items such as a header, footer, history, back/forward buttons and other navigation and display elements. The tone command list may also include producer and content metadata.

The tone command list 1214 may be sent to the tone command database 1215 where it may be stored. The tone command database may assign a Unique Action Reference Code (UARC) 1232. The unique reference code may contain a unique tone command database file code assigned to the tone command list. One or more audio tone tip files may be generated from the unique reference code 1232. The tone tip and metadata 1216 may be sent to the producer.

The producer may add the tone tip audio files and metadata to the Audio Production (AP) file 1218 to form the Tone Tip Production (TTP) file. The producer may send the tone tip media production file to one or more broadcasters 1220. The broadcaster may receive the tone tip media production file 1250. The tone tip media production file may be stored for later use.

When the platform tone command database receives all planned tone tip media production files, the broadcaster may disconnect from the tone command database and from the Internet. This commonly occurs with aircraft are in flight, ships are underway, trains and automobiles are out of range of Internet services. When Internet service is available, the audio signal processing device may connect to the tone command database through the Internet or cell phone network. In this case, the audio signal processing device may use either broadcast or PA tone tip applications.

The direct text application may also available for communications between the broadcaster and audio signal processing devices when disconnected from the Internet.

The broadcaster may send the tone tip media production file to one more audio signal processing device through the PA 1260 or media distribution systems 1262. The tone tip media production file may be received by the audio signal processing device 1272 and the unique reference code may be decoded from the tone tip or the tone tip media production file metadata 1284. The data retrieval request may be sent to the Platform tone command database 1264. The Platform tone command database may receive the data retrieval request, and retrieve the tone command list associated with unique reference code 1252. The tone command list may be send to the audio signal processing device 1266. The tone command list may be displayed on the audio signal processing device 1282 and the listener may respond. When the listener responds, a user request message may be sent to the platform tone command database 1268 from the audio signal processing device. The platform tone command database may provide content associated with the user request message 1254 and provides a Tone Command Action Response (TCAR) to the audio signal processing device 1270. The audio signal processing device may display the TCAR or save TCAR data to the tone command history list.

At step 1310, the producer may complete tone command list 1312.

At step 1314, the producer may send a tone command list to the tone command database.

At step 1315, the tone command database may receive tone command list from producer and stores data.

At step 1332, the tone command database may create a Unique Action Request Code (UARC) for each new tone command list received.

At step 1332, the tone command database may encode a unique reference code into a Metadata File (MDF).

At step 1316, the tone command database may send a metadata file to the producer.

At step 1318, the producer may insert the metadata file into a Tone Tip Production (TTP) file.

At step 1320, the producer may send a tone tip media production file to the broadcaster.

At step 1350, the broadcaster may receive a tone tip media production file from the producer.

At step 1352, the broadcaster may send a tone tip media production file to Radio/TV receivers 1358.

At step 1353, the broadcaster may send Broadcast Tone Tip Data (BTTD) to the tone command database.

At step 1360, the receiver may receive and decode the unique reference code from tone tip media production file. The unique reference code may be contained in the media metadata file.

At step 1361 a sonic signal may be output on a speaker or headset.

At step 1362, the receiver may send the unique reference code to audio signal processing device using Bluetooth or other network connection.

At step 1370, the audio signal processing device may receive the unique reference code from the receiver.

At step 1376, the audio signal processing device may send a Tone Command List Request (TCLR) to the tone command database. The list request may contain unique reference code and audio signal processing device metadata.

At step 1377, the tone command database may receive a data retrieval request, saves audio signal processing device metadata, retrieve the tone command list associated with unique reference code and send tone command list to audio signal processing device.

At step 1378, the audio signal processing device may receive and displays the tone command list.

If the user selects a command at audio signal processing device, then the following steps may be processed.

At step 1370, the audio signal processing device may process tone commands as requested by the user.

At step 1380, the audio signal processing device may use other network resources to complete action processing.

At step 1379, the audio signal processing device may send a Tone Command Response (TCR) to the tone command database.

At step 1390, the audio signal processing device may send a user request message to the producer if requested by the producer.

At step 1336, the producer may request and receive broadcaster tone tip data and audio signal processing device data 1334.

At step 1354, the broadcaster may request and receive audio signal processing device data.

Instant Action Commands

Instant action commands may be processed immediately by the audio signal processing device. The sequence may use the steps above but processes step 1370 automatically (without listener interaction).

The tone tip Bluetooth broadcast application focuses on RF broadcasts including radio, TV, cable, and satellite communications. The difference between the Bluetooth application and the regular broadcast application is that the Bluetooth method focuses on delivery of the unique reference code to the audio signal processing device via Bluetooth rather than audio. The unique reference code may be decoded from broadcast RF data at the Radio/TV receiver rather than AF data at the audio signal processing device. Bluetooth encoding and decoding eliminates decoding errors often associated with audio signal processing.

Figure 14:
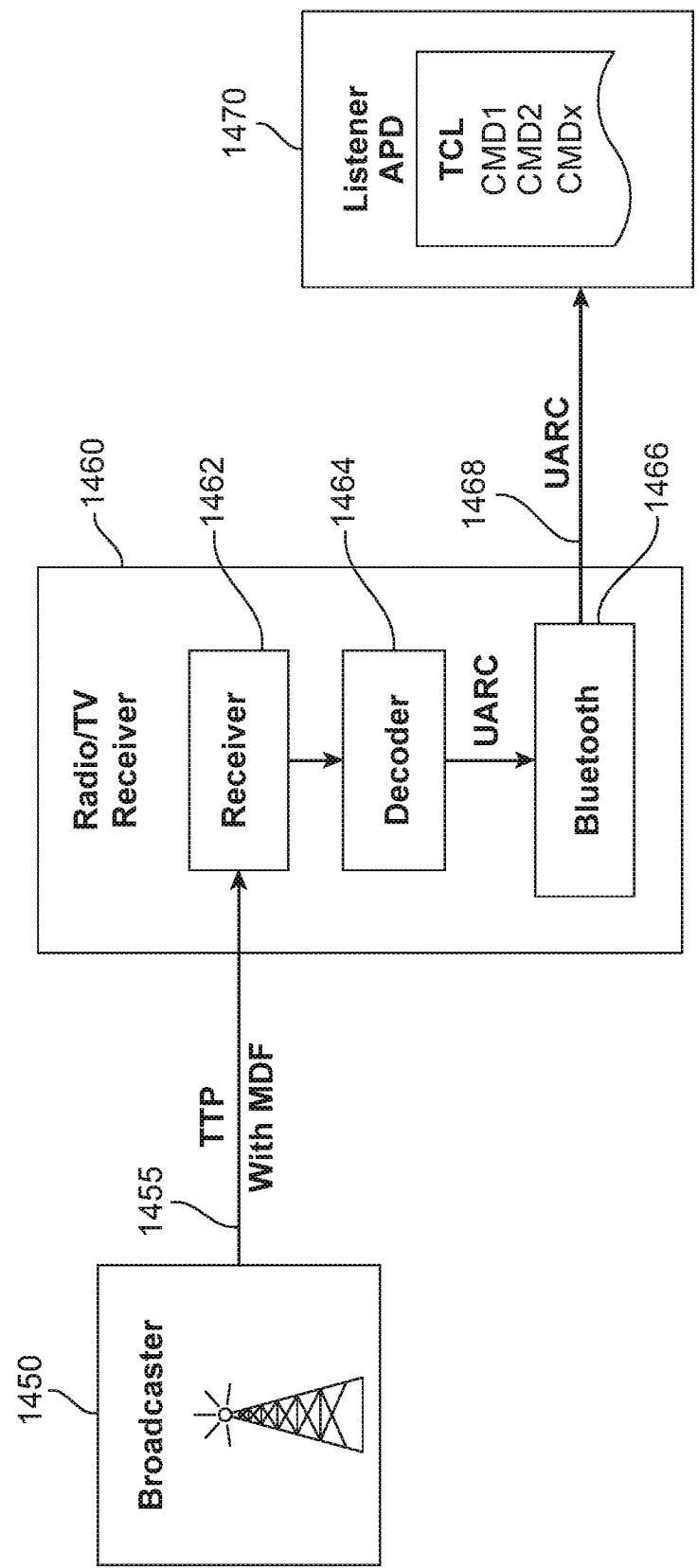
FIG. 14 shows a block diagram illustrating exemplary details associated with a use of Bluetooth communication to process tone tips.

Radio Data System (RDS) is a communications protocol standard for embedding small amounts of digital information in conventional FM radio broadcasts. RDS Radio Text (RDS-RT) is one function of RDS that allows a radio station to transmit 64-characters of free-form text. That text may be static or synchronized with the programming. With FM radio, the unique reference code may be broadcast as part of the RDS-RT to the FM radio receiver. A Bluetooth connection may send the unique reference code from the radio to one or more audio signal processing devices. Other communication data transmission methods may be used, such as AMSS, DARC, Direct Band, PAD, PDS and other state of the art methods. The detailed of the Bluetooth method is shown in FIG. 14.

The broadcast application may start with the producer. The producer may be any computing device such as a smart phone, laptop, desktop or network computer. The producer may also be a computer program, running on a computing device. The producer and broadcaster may be consolidated into one device.

After the tone tip computer program is started, the producer 1310 may complete the Tone Command List (TCL) 1312. The producer may select commands, values, and options for each tone command. The producer may select the Bluetooth standard for encoding and transmission. Broadcast encoding is different FM radio, TV, cable and satellite. The tone command list may be comprised of one or more Tone Commands. There may also be tone command list optional items such as a header, footer, history, back/forward buttons and other navigation and display elements. The tone command list may also include producer and content metadata.

The tone command list may be sent to the tone command database where it is stored 1315. The tone command database may assign a Unique Action Reference Code (UARC) 1332. The unique reference code may contain a unique file code assigned to the tone command list. A Metadata File (MDF) may be generated which includes the unique reference code 1332. The MDF may be sent to the producer 1316.

The producer may add the MDF to the Audio Production (AP) file to form the Tone Tip Production (TTP) file 1318. The producer may send the tone tip media production file to one or more broadcasters 1320.

The broadcaster may receive tone tip media production files from one or more producers 1350. The tone tip media production file may be used immediately or stored for later use. The tone tip media production file may be sent to one or more radio or TV signal receivers 1352. Optionally, Broadcaster Tone Tip Data (BTTD) may be sent to the tone command database 1353. Broadcaster tone tip data may support system data analysis and reporting.

The radio or TV receiver may detect the RF signal 1358 and extract the unique reference code from the metadata file or other encoded data stream 1360. The unique reference code may be sent to the audio signal processing device 1362 using a Bluetooth, wireless, or wired connection or transmitted as a sonic signal when output on a speaker 1361. This method eliminates decoding errors associated with audio frequency signal processing. In some cases, the radio receiver may be contained within the audio signal processing device, such as a smartphone with a built in radio, or reception of Internet radio, or other Internet audio or video content.

The audio signal processing device may receive the unique reference code 1370. As with other tone tip processes, the unique reference code along with General Listener Data (GLD) may be sent the tone command database as a Tone Command List Request (TCRL) 1376. The tone command database may process the TCRL, using the unique reference code to reference the tone command list 1315 and return the tone command list to the audio signal processing device 1377. The tone command database may store audio signal processing device metadata, unique reference code, and broadcaster tone tip data. This may be used for real time and post event analysis. The audio signal processing device receives and display the tone command list 1378. The Listener may now take one or more actions associated with the tone command list. If one or more actions are taken, a Tone Command Response (TCR) 1379 may be sent to the tone command database. A Tone Command Response (TCR) may be sent to the producer for every action taken by the listener 1390 if requested by the producer.

The audio signal processing device may use other network resources 1380 to complete action processing. The user request message may contain audio signal processing device metadata, unique reference code, and a list of specific commands selected. The producer may request audio signal processing device data 1334 and broadcaster tone tip data 1336 to conduct real time and post event analysis or other purposes. This analysis may be used to determine listener response, tone tip media production file effectiveness, broadcaster effectiveness, and other information associated with broadcast media. The broadcaster may request audio signal processing device data 1354 and broadcaster tone tip data to conduct real time and post event analysis. This analysis may be used to determine listener response, tone tip media production file effectiveness, broadcaster effectiveness, broadcaster coverage area and other information associated with broadcast media.

Details of Bluetooth are illustrated in FIG. 14. A broadcaster 1450 may transmit a tone tip media production file to one or more TVs or radios 1455. The tone tip media production file may include one or more metadata files that contain one or more reference codes associated with the tone tip media production file. The radio or TV 1460 receiver detects the signal 1462 and decodes the broadcast message 1464. The unique reference code is extracted from the broadcast data. The unique reference code is then encoded for Bluetooth transmission and sent to a Bluetooth transmitter 1466. The unique reference code is transmitted 1468 to one or more audio signal processing device in the receiving area of the Bluetooth signal 1470. Additional hardware and software may be provided for TVs and radios to decode the encoded unique reference code and transmit it using Bluetooth.

Figure 15:
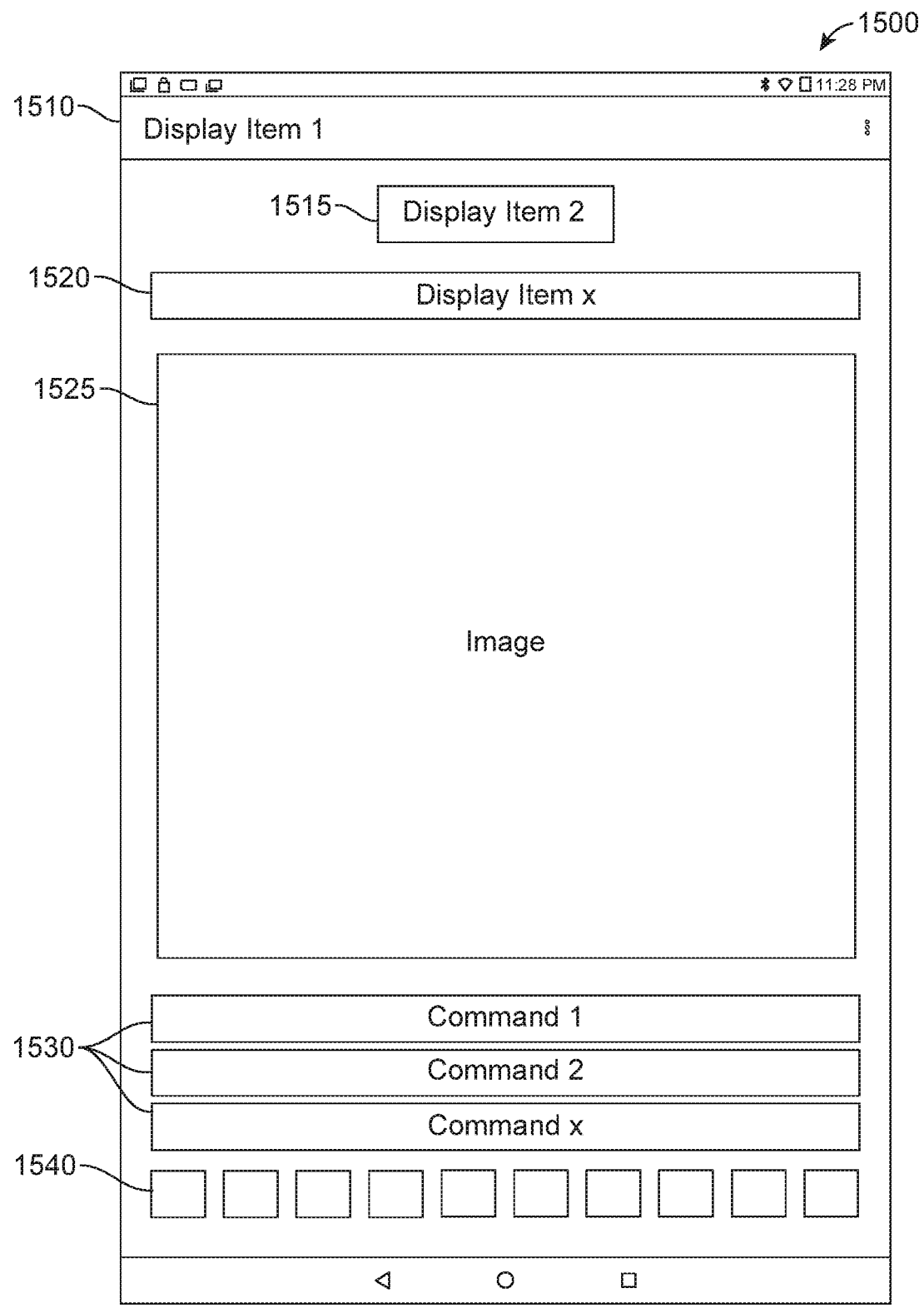
FIG. 15 shows an example of a method to display command actions.

FIG. 15 is one example of a user interface on an audio signal processing device 1500. This example illustrates that multiple areas may be designated by the application, tone command database, producer, broadcaster, or listener to display information. The top of the display 1510 of the display device may contain details or setting information. Other areas 1515, 1520 near the top may display headline, title or other information. One or more images 1525 may be included as part of the user interface. One or more commands 1530 may be included as displayed data items on the display device screen. One or more smaller linked areas 1540 may be provided to accommodate links to other actions such as social media, email, and text. This figure is intended for illustrative purposes only. Many other embodiments will be apparent to those skilled in the art of user interface design.

Figure 16:
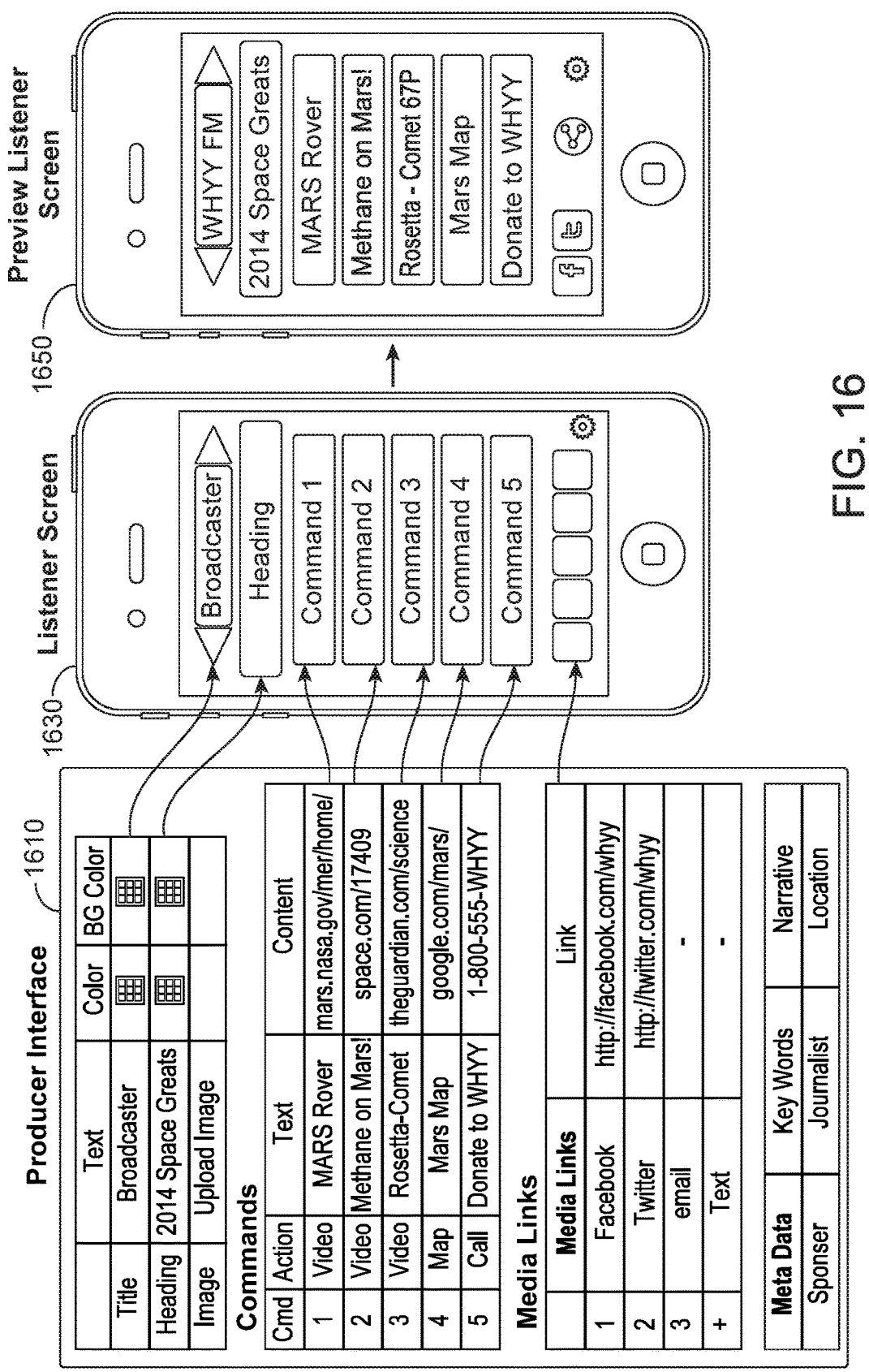
FIG. 16 shows an example of a method to produce a list of command actions.

FIG. 16 is one example of a producer interface 1610. In this example a media producer is provided with a list of options for the Tone Command List (TCL) to be displayed on the Audio signal Processing Device 1630. The tone command list may include a title, heading, images, commands, social media links, metadata input, and options for action button colors. This example illustrates how the producer may be presented with a preview screen 1650 of the display device showing how the tone command list may appear on an audio signal processing device. This figure is intended for illustrative purposes only. Many other embodiments will be apparent to those skilled in the art of user interface design and database design.

Figure 17:
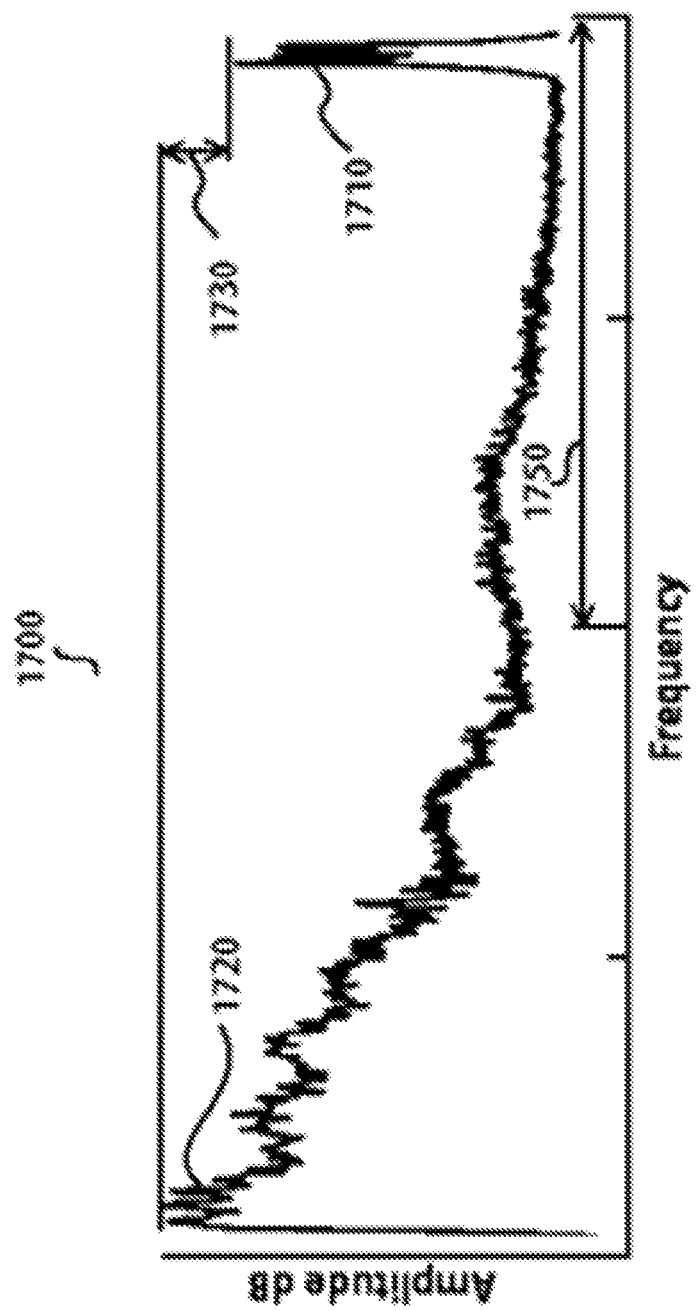
FIG. 17 shows an example of a frequency spectrum of a composite signal having a single tone tip signal.

An example of a composite signal having an audio base signal and single tone tip signals is illustrated in FIG. 17. The entire audio frequency band 1700, also referred to as a sonic first frequency bandwidth having a single tone tip signal 1710, having a smaller second frequency bandwidth as shown in the upper portion 1750 of the audio frequency band of the base signal. The portion of the audio base signal most audible to humans is shown at 1720 and occupies the lower portion of the audio frequency band of the base signal.

Frequencies below 5 kHz are more detectable by humans and frequencies above 5 kHz are less detectable by humans.

In order to mask the tone tip signal, the media producer may keep the peak amplitude of the tone tip signal 4 dB or more below the peak amplitude of the main media signal. The amplitude difference is shown at 1730. This may be done for the duration of the tone tip signal.

The maximum upper range of the frequency band depends on the media being used. The upper limit of AM radio may be 7 kHz and the upper limit of the FM band may be 20 kHz. Public address systems, also called sound amplification systems, may have an upper limit of 5 kHz for lower quality PA systems, while high quality sound amplification systems may be beyond 20 kHz. Compressed audio and video have audio frequency limits dependent upon the compression and decompression method.

Higher frequencies are less detectable by humans. The media producer may desire to use the higher frequency tone tip signals to make the tone tip audio less detectable by humans. The media producer may also endure the amplitude of the tone tip signal may be at least 5 dB below the peak audio signal. An audio distribution system may further limit audio distribution so the media producer utilize more than one tone tip within a tone tip production file. A tone tip media production may be made for each media type, including a tone tip signal best suited for the delivery media.

Figure 18:
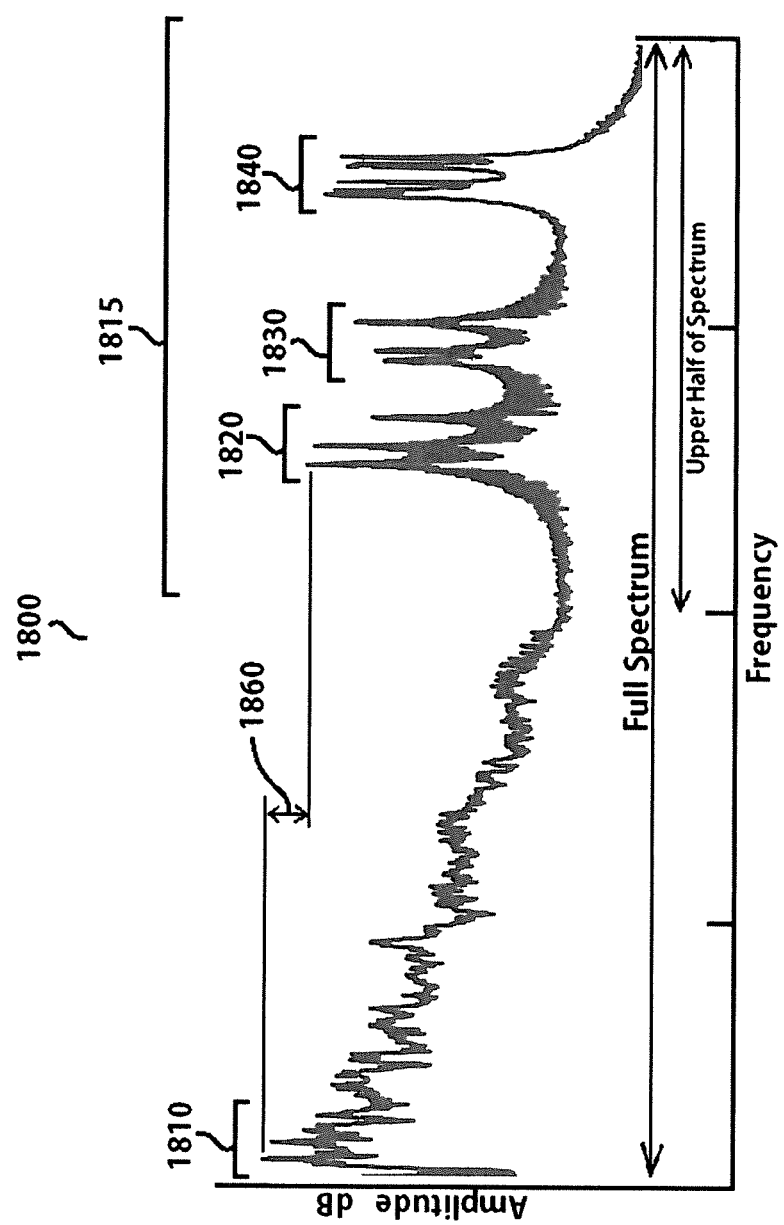
FIG. 18 shows an example of a frequency spectrum of a composite signal having a plurality of tone tip signals.

An example of a composite signal having an audio base signal and plural tone tip signals is illustrated in FIG. 18. The entire audio frequency band or sonic first frequency bandwidth is shown at 1800. The upper limit of human hearing is 20 kHz. Humans are primarily sensitive to frequencies below 5 kHz. Audio from human voices typically has a highest amplitude in the lower frequency range 1810 of human hearing and humans are less sensitive to higher frequencies. This allows tone tips (code signals) to be added to the upper half 1815 of the audio band 1800 of media productions (audio base signals) with little or no impact to the audio production. Since different media may use different frequency selections, the media producer may include more than tone tip within each media production. The media producer may add one tone tip 1820 for streaming media, one 1830 for FM radio, and a third 1840 for high quality PA systems in the same audio production. The advantage to this method is that the media producer may produce one media production that may be delivered to multiple media distribution channels.

In order to mask the tone tip signal, the media producer may keep the peak amplitude of the tone tip signals 4 dB or more below the peak amplitude of the main media signal 1860. This may be done for the duration of the tone tip signal.

A benefit to the producer of receiving two or more tone tip audio files from the tone command center database is that it saves production time. If one tone tip is 18 kHz and the other is 14 kHz, a producer developing a media production for both radio and a podcast may use the 18 kHz for radio and 14 kHz for the more frequency limited podcast. If just one frequency is generated by the TCC, then the producer may request the TCC to generate a second frequency. Following are examples of frequencies that may be used to produce tone tips for different exemplary media. Other frequencies for these or other media may also be used.

18 kHz for what may be considered extra-wide bandwidth media (20 Hz-20 kHz), such as FM radio, TV, highly compressed audio and video files, low quality streaming media, high quality public address systems, Microsoft PowerPoint audio files, and uncompressed audio files;

14 kHz for what may be considered wide bandwidth media (20 Hz to 17 kHz), such as YouTube, Vimeo, SoundCloud, and other high quality podcasts, medium quality streaming media, compressed audio files, and medium quality public address systems;

10 kHz for what may be considered medium bandwidth media (20 Hz-14 kHz), such as medium quality podcasts and compressed audio files;

5 kHz for what may be considered low bandwidth media (20 Hz to 12 kHz), such as AM radio, highly compressed audio files, lower quality streaming media, and low quality public address systems; and 2.5 kHz for what may be considered very low bandwidth media (below 12 kHz), such as telephones, AM radio, shortwave radio, highly compressed audio and video files, low quality streaming media, and other low bandwidth transmissions.

If a composite signal includes two or more tone tips, then wide bandwidth media like FM radio would transmit both 18 kHz and 14 kHz tone tips while YouTube would cut out the higher frequency. Logic within a decoder of the signal processing device could ignore the second tone tip if received within a predetermined period of time, such as 30 seconds.

An audio signal processing device may be configured to listen to more than one set of decoding parameters. The benefit is that the user doesn't have to manually switch the signal processing device between FM/TV decoding and Internet (i.e., YouTube or other media distributed via the Internet) encoding. A cost of doing this is that dual processing uses more power, but it's not two times more power. An audio signal processing device may be configured to listen for all 5 bands above; however two tone tips having respective frequency bands selected for low and medium bandwidths may cover a large majority of the different types of media in use.

Figure 19:
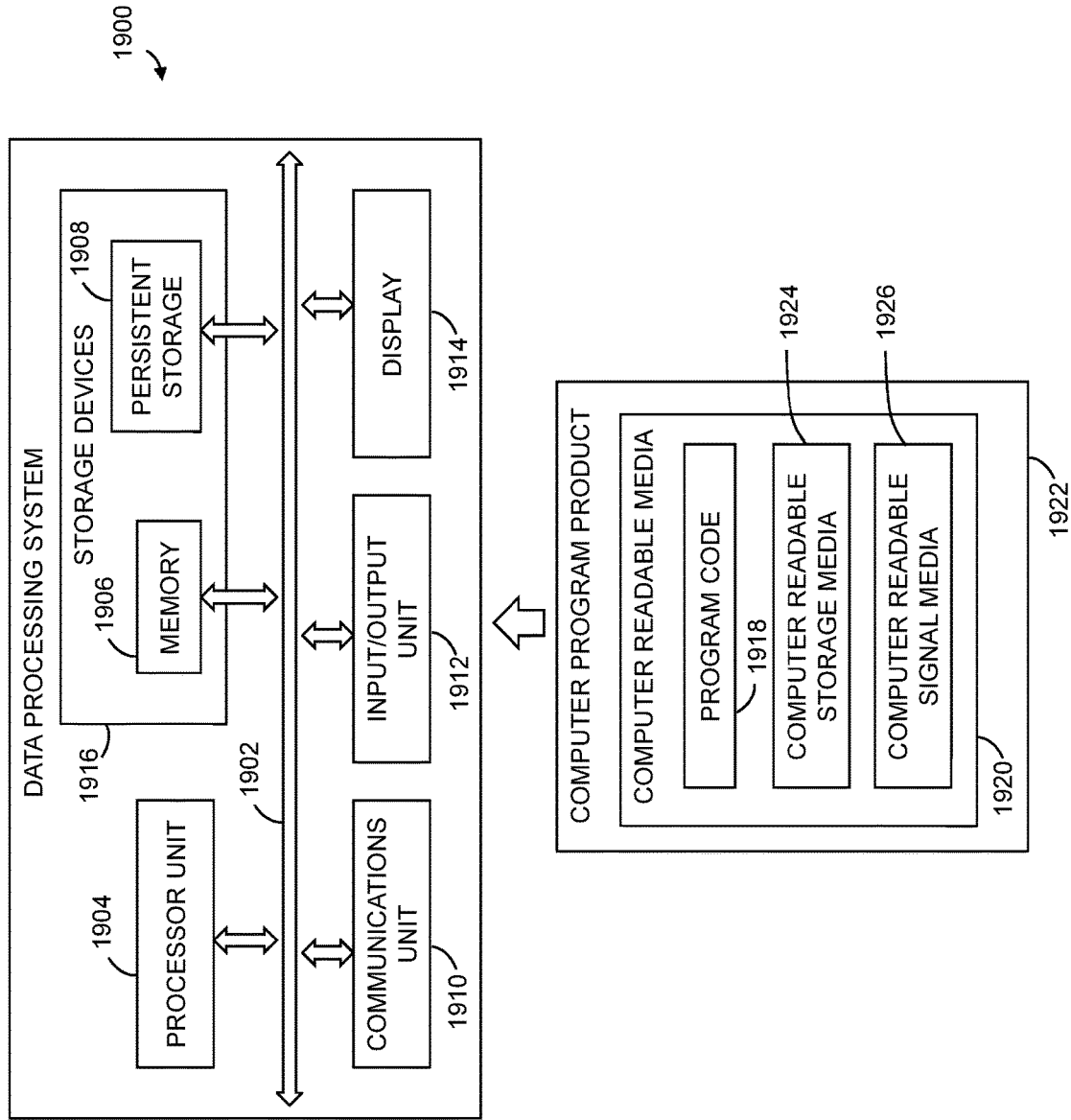
FIG. 19 is a block diagram of an example of a computer system or smart device that may be used in the examples illustrated in the preceding figures.

As shown in FIG. 19, this example describes a data processing system 1900 in accordance with aspects of the present disclosure. In this example, data processing system 1900 is an illustrative data processing system suitable for implementing aspects of data communication with acoustic signal communication as described in the preceding description. More specifically, in some examples, devices that are embodiments of data processing systems (e.g., smartphones, tablets, personal computers) may be used as a server in the tone command center, the producer, the broadcaster, or the audio signal processing device in the various embodiments described above.

In this illustrative example, data processing system 1900 includes communications framework 1902. Communications framework 1902 provides communications between processor unit 1904, memory 1906, persistent storage 1908, communications unit 1910, input/output (I/O) unit 1912, and display 1914. Memory 1906, persistent storage 1908, communications unit 1910, input/output (I/O) unit 1912, and display 1914 are examples of resources accessible by processor unit 1904 via communications framework 1902.

Processor unit 1904 serves to run instructions that may be loaded into memory 1906. Processor unit 1904 may be a number of processors, a multi-processor core, or some other type of processor, depending on the particular implementation. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device is any piece of hardware that is capable of storing information, such as, for example, without limitation, data, program code in functional form, and other suitable information either on a temporary basis or a permanent basis.

Storage devices 1916 also may be referred to as computer-readable storage devices in these examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 is a network interface card. Communications unit 1910 may provide communications through the use of either or both physical and wireless communications links.

Input/output (I/O) unit 1912 allows for input and output of data with other devices that may be connected to data processing system 1900. For example, input/output (I/O) unit 1912 may provide a connection for user input through a keyboard, a mouse, and/or some other suitable input device. Further, input/output (I/O) unit 1912 may send output to a printer. Display 1914 provides a mechanism to display information to a user.

Instructions for the operating system, applications, and/or programs may be located in storage devices 1916, which are in communication with processor unit 1904 through communications framework 1902. In these illustrative examples, the instructions are in a functional form on persistent storage 1908. These instructions may be loaded into memory 1906 for execution by processor unit 1904. The processes of the different embodiments may be performed by processor unit 1904 using computer-implemented instructions, which may be located in a memory, such as memory 1906.

These instructions are referred to as program instructions, program code, computer usable program code, or computer-readable program code that may be read and executed by a processor in processor unit 1904. The program code in the different embodiments may be embodied on different physical or computer-readable storage media, such as memory 1906 or persistent storage 1908.

Program code 1918 is located in a functional form on computer-readable media 1920 that is selectively removable and may be loaded onto or transferred to data processing system 1900 for execution by processor unit 1904. Program code 1918 and computer-readable media 1920 form computer program product 1922 in these examples. In one example, computer-readable media 1920 may be computer-readable storage media 1924 or computer-readable signal media 1926.

Computer-readable storage media 1924 may include, for example, an optical or magnetic disk that is inserted or placed into a drive or other device that is part of persistent storage 1908 for transfer onto a storage device, such as a hard drive, that is part of persistent storage 1908. Computer-readable storage media 1924 also may take the form of a persistent storage, such as a hard drive, a thumb drive, or a flash memory, that is connected to data processing system 1900. In some instances, computer-readable storage media 1924 may not be removable from data processing system 1900.

In these examples, computer-readable storage media 1924 is a physical or tangible storage device used to store program code 1918 rather than a medium that propagates or transmits program code 1918. Computer-readable storage media 1924 is also referred to as a computer-readable tangible storage device or a computer-readable physical storage device. In other words, computer-readable storage media 1924 is non-transitory.

Alternatively, program code 1918 may be transferred to data processing system 1900 using computer-readable signal media 1926. Computer-readable signal media 1926 may be, for example, a propagated data signal containing program code 1918. For example, computer-readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1918 may be downloaded over a network to persistent storage 1908 from another device or data processing system through computer-readable signal media 1926 for use within data processing system 1900. For instance, program code stored in a computer-readable storage medium in a server data processing system may be downloaded over a network from the server to data processing system 1900. The data processing system providing program code 1918 may be a server computer, a client computer, or some other device capable of storing and transmitting program code 1918.

The different components illustrated for data processing system 1900 are not meant to provide architectural limitations to the manner in which different embodiments may be implemented. The different illustrative embodiments may be implemented in a data processing system including components in addition to and/or in place of those illustrated for data processing system 1900. Other components shown in FIG. 19 can be varied from the illustrative examples shown. The different embodiments may be implemented using any hardware device or system capable of running program code. As one example, data processing system 1900 may include organic components integrated with inorganic components and/or may be comprised entirely of organic components excluding a human being. For example, a storage device may be comprised of an organic semiconductor.

In another illustrative example, processor unit 1904 may take the form of a hardware unit that has circuits that are manufactured or configured for a particular use. This type of hardware may perform operations without needing program code to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1918 may be omitted, because the processes for the different embodiments are implemented in a hardware unit.

In still another illustrative example, processor unit 1904 may be implemented using a combination of processors found in computers and hardware units. Processor unit 1904 may have a number of hardware units and a number of processors that are configured to run program code 1918. With this depicted example, some of the processes may be implemented in the number of hardware units, while other processes may be implemented in the number of processors.

In another example, a bus system may be used to implement communications framework 1902 and may be comprised of one or more buses, such as a system bus or an input/output bus. Of course, the bus system may be implemented using any suitable type of architecture that provides for a transfer of data between different components or devices attached to the bus system.

Additionally, communications unit 1910 may include a number of devices that transmit data, receive data, or both transmit and receive data. Communications unit 1910 may be, for example, a modem or a network adapter, two network adapters, or some combination thereof. Further, a memory may be, for example, memory 1906, or a cache, such as that found in an interface and memory controller hub that may be present in communications framework 1902.

It can be seen from the above examples, that various functions and structures may be used. For example, a data base system, such as the Tone Command Center, may be configured to receive from a production or distribution entity, generally referred to as a producer, a command list, such as a Tone Command List. The Tone Command List may include one or more commands defining an action to be taken by a signal processing device, such as an audio signal processing device, or an associated file item. The data base system may assign a unique reference code to the received command list, and generate at least one code signal encoded with the unique reference code, each code signal being appropriate for output on a speaker. The data base system may then transmit the at least one code signal to the producer.

When more than one code signal is generated, the code signals may have a frequency spectrum or bandwidth selected for transmission in a particular media, and each code signal may have a different bandwidth for transmission in different media. The bandwidths of the code signals may be in an upper half of a bandwidth of the associated media.

The data base system may also receive the unique reference code and a request for the associated command or file-item list from a signal processing device, such as an audio signal processing device that received and decoded one of the at least one code signal. The data base system may then retrieve the command list for the received code signal, and send the command list to the signal processing device. The data base system may also receive and store a message received from the signal processing device of what action was taken by the signal processing device in response to the command list.

The data base system may also receive a notification from a broadcaster or other distributor of the code signal indicating information about a broadcasting or distribution of the code signal. The data base system may send such broadcasting or distribution information to the producer, and then may also send to the producer or the broadcaster information about action taken by one or more signal processing devices in response to the received command list.

In some examples, the producer may produce a command list, send the command list to the data base system, and request at least one associated code signal. More than one associated code signal may be requested, and appropriate code signals may be requested for different media. The producer may receive the one or more code signals and produce a composite signal having frequencies within a sonic first frequency bandwidth, the composite signal including an audio base signal and one or more code signal. Each code signal may be encoded with a code, have a duration shorter than a duration of the base signal, and have a second frequency bandwidth within the first frequency bandwidth. The second frequency may be in an upper half of the first frequency bandwidth. One or more of the code signals in the composite signal may have an amplitude that is less than 4 dB below a peak amplitude of the base signal. The producer may send the composite signal or may send one or more code signals to a broadcaster for broadcast or other distribution.

The producer may also receive a notification from a broadcaster or other distributor of the code signal or from the data base system indicating information about a broadcasting or distribution of the code signal. The producer may also receive from the data base system or from one or more signal processing devices information about action taken by one or more signal processing devices in response to the received command list.

This section describes additional aspects and features of interactive data communication with acoustic signal communication, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method comprising receiving from a communication media on a signal receiver a composite signal having frequencies within a sonic first frequency bandwidth, the composite signal including an audio base signal and at least one code signal, the code signal being encoded with a code, having a duration shorter than a duration of the base signal, and having a second frequency bandwidth within the first frequency bandwidth; outputting the composite signal on a speaker, the speaker converting the composite signal into sound; while outputting the composite signal, detecting by a signal processing device the output sound corresponding to the code signal; determining the code from the detected output sound corresponding to the code signal; retrieving from a data storage device data associated with the code; and displaying on a display device the retrieved data.

A1. The method of paragraph A0, wherein retrieving data associated with the code includes retrieving content including at least one of a file item, file metadata, text to be displayed to a user, a link to an Internet web site, a command for the computing device, one or more actions to be performed by the computing device, or a combination of one or more of each of two or more of these types of content.

A2. The method of paragraph A0, wherein retrieving data associated with the code includes retrieving a plurality of data items for selection by a user, and displaying the retrieved data includes displaying the plurality of data items, the method further comprising receiving on the signal processing device an input from a user selecting at least one of the plurality of displayed data items.

A3. The method of paragraph A2, further comprising sending to a remote server associated with the code signal an indication as to the at least one of the plurality of data items selected by the user.

A4. The method of paragraph A2, further comprising, in response to receiving an input from a user selecting at least one of the plurality of displayed data items, sending to a remote server associated with the code signal information about the signal processing device at the time of the selection or information related to the selection.

A5. The method of paragraph A4, wherein sending information about the signal processing device includes sending one or more items of information selected in any combination from the group of an identification of the signal processing device, an ambient condition of the signal processing device that is detected by the signal processing device, a date of the selection, and a time of the selection.

A6. The method of paragraph A0, wherein receiving a composite signal includes receiving a composite signal having a plurality of code signals, detecting the output sound corresponding to the code signal includes detecting the output sound corresponding to the plurality of code signals, and determining the code corresponding to the code signal includes determining the code corresponding to a selected one of the code signals.

A7. The method of paragraph A6, wherein each of the plurality of code signals has a different frequency spectrum.

A8. The method of paragraph A7, wherein receiving a composite signal includes receiving a composite signal in which each of the plurality of code signals has an associated second frequency bandwidth that is within the upper half of the first frequency bandwidth.

A9. The method of paragraph A0, wherein receiving a composite signal includes receiving a composite signal in which the second frequency bandwidth is within the upper half of the first frequency bandwidth.

B0. In some examples, a method comprising receiving from a communication media on a signal receiver a composite signal having frequencies within a sonic first frequency bandwidth, the composite signal including an audio base signal and at least one code signal, the code signal being encoded with a code, having a duration shorter than a duration of the base signal, and having a second frequency bandwidth within the first frequency bandwidth; outputting the composite signal on a speaker, the speaker converting the composite signal into sound; while outputting the composite signal, detecting by a signal processing device the output sound corresponding to the code signal; determining the code from the detected output sound corresponding to the code signal; automatically in response to determining the code and prior to displaying information in response to determining the code, determining whether code-associated data associated with the code is stored on an internal data storage device of the signal processing device, and if it is determined that the code-associated data is stored on the internal data storage device, retrieving from the internal data storage device the code-associated data, and if it is determined that the code-associated data is not stored on the internal data storage device, retrieving the code-associated data from a data-base server that is remote from the signal processing device and has an associated data storage device storing in a code data base a plurality of different codes and respective code-associated data for each of the plurality of different codes; automatically in response to determining the code, sending to the data-base server signal-processing-device-specific data, the signal-processing-device-specific data including data representative of a device unique identification number, displaying on a display device of the signal processing device the retrieved code-associated data; receiving on the signal processing device a user input that is input using the displayed code-associated data; and automatically in response to receiving the user input, sending to the data-base server the signal-processing-device-specific data also including data representative of the specific user action taken.

B1. The method of paragraph B0, wherein retrieving the code-associated data includes retrieving at least one of a file item, file metadata, text to be displayed to a user, a link to an Internet web site, a command for the computing device, or one or more actions to be performed by the signal processing device.

B2. The method of paragraph B0, wherein retrieving the code-associated data includes retrieving a plurality of data items for selection by a user, and displaying the retrieved code-associated data includes displaying the plurality of data items, and receiving a user input includes receiving a user input selecting at least one of the plurality of displayed data items.

B3. The method of paragraph B0, wherein receiving a composite signal includes receiving a composite signal having a plurality of code signals, detecting the output sound corresponding to the code signal includes detecting the output sound corresponding to the plurality of code signals, and determining the code corresponding to the code signal includes determining the code corresponding to a selected one of the code signals.

B4. The method of paragraph B3, wherein receiving a composite signal having the plurality of code signals includes receiving a composite signal having at least two code signals having the same code and different frequency spectra.

C0. A receiver assembly comprising a signal receiver for receiving from a communication media a composite signal having frequencies within a sonic first frequency bandwidth, the composite signal including an audio base signal and a code signal, the code signal being encoded with a code, having a duration shorter than a duration of the base signal, and having a second frequency bandwidth within the first frequency bandwidth; a speaker operatively coupled to the signal receiver for outputting the composite signal, including the audio base signal and the code signal, as sound; and a signal processing device configured to detect the output sound corresponding to the code signal, determine the code from the detected output sound corresponding to the code signal, retrieve from a data storage device data associated with the code, and display the retrieved data.

C1. The receiver assembly of paragraph C0, wherein the signal processing device is further configured to retrieve content including at least one of a file item, file metadata, text to be displayed to a user, a link to an Internet web site, a command for the computing device, one or more actions to be performed by the computing device, or a combination of one or more of each of two or more of these types of content.

C2. The receiver assembly of paragraph C0, wherein the signal processing device is further configured to retrieve content including a plurality of data items for selection by a user, display the plurality of data items, and receive an input from a user selecting at least one of the plurality of displayed data items.

C3. The receiver assembly of paragraph C2, wherein the signal processing device is further configured to send to a remote server associated with the code signal an indication as to the at least one of the plurality of data items selected by the user.

C4. The receiver assembly of paragraph C2, wherein the signal processing device is further configured, in response to receiving an input from a user selecting at least one of the plurality of displayed data items, to send to a remote server associated with the code signal information about the signal processing device at the time of the selection or information related to the selection.

C5. The receiver assembly of paragraph C4, wherein the signal processing device is further configured to send to the remote server one or more items of information selected in any combination from the group of an identification of the signal processing device, an ambient condition of the signal processing device that is detected by the signal processing device, a date of the selection, and a time of the selection.

C6. The receiver assembly of paragraph C0, wherein the signal receiver is further configured to receive a composite signal having a plurality of code signals, and the signal processing device is further configured to detect the output sound corresponding to the plurality of code signals, and determine the code corresponding to a selected one of the code signals.

C7. The receiver assembly of paragraph C6, wherein the signal receiver is further configured to receive a composite signal in which each of the plurality of code signals has a different frequency spectrum.

C8. The receiver assembly of paragraph C7, wherein the signal receiver is further configured to receive a composite signal in which each of the plurality of code signals has an associated second frequency bandwidth that is within the upper half of the first frequency bandwidth.

C9. The receiver assembly of paragraph C0, wherein the signal receiver is further configured to receive a composite signal in which the second frequency bandwidth is within the upper half of the first frequency bandwidth.

D0. In some examples, a receiver assembly comprising a signal receiver for receiving from a communication media a composite signal having frequencies within a sonic first frequency bandwidth, the composite signal including an audio base signal and a code signal, the code signal being encoded with a code, having a duration shorter than a duration of the base signal, and having a second frequency bandwidth within the first frequency bandwidth; a speaker operatively coupled to the signal receiver for outputting the composite signal, including the audio base signal and the code signal, as sound; and a signal processing device configured to: detect the output sound corresponding to the code signal, determine the code from the detected output sound corresponding to the code signal, automatically in response to determining the code and prior to displaying information in response to determining the code, determine whether code-associated data associated with the code is stored on an internal data storage device of the signal processing device, and if it is determined that the code-associated data is stored on the internal data storage device, retrieve from the internal data storage device, the code-associated data, and if it is determined that the code-associated data is not stored on the internal data storage device, retrieve the code-associated data from a data-base server that is remote from the signal processing device and has an associated data storage device storing in a code data base a plurality of different codes and respective code-associated data for each of the plurality of different codes; automatically in response to determining the code, send to the data-base server signal-processing-device-specific data, the signal-processing-device-specific data including data representative of a device unique identification number; display the retrieved code-associated data; receive a user input that is input using the displayed code-associated data; and automatically in response to receiving the user input, send to the data-base server the signal-processing-device-specific data also including data representative of the specific user action taken.

D1. The receiver assembly of paragraph D0, wherein the signal processing device is configured to retrieve code-associated data including at least one of a file item, file metadata, text to be displayed to a user, a link to an Internet web site, a command for the computing device, or one or more actions to be performed by the signal processing device.

D2. The receiver assembly of paragraph D0, wherein the signal processing device is configured to retrieve code-associated data including a plurality of data items for selection by a user, display the plurality of data items, and receive an input from a user selecting at least one of the plurality of displayed data items.

D3. The receiver assembly of paragraph D0, wherein the signal receiver is further configured to receive a composite signal having a plurality of code signals, and the signal processing device is further configured to detect the output sound corresponding to the plurality of code signals, and determine the code corresponding to a selected one of the code signals.

D4. The receiver assembly of paragraph D3, wherein the signal receiver is further configured to receive a composite signal in which at least two of the plurality of code signals have the same code and different frequency spectra.

E0. A computer program product, comprising at least one computer readable storage medium having computer readable program instructions embodied therewith, the computer readable program instructions, when executed by a processor, configuring the processor to receive sound from a speaker outputting a composite signal including an audio base signal and a code signal, as sound, the composite signal having frequencies within a sonic first frequency bandwidth, and the code signal being encoded with a code, having a duration shorter than a duration of the base signal, and having a second frequency bandwidth within the first frequency bandwidth; detect the output sound corresponding to the code signal; determine the code from the detected output sound corresponding to the code signal; retrieve from a data storage device data associated with the code; and display the retrieved data.

E1. The computer program product of paragraph E0, wherein the computer readable program instructions, when executed by the processor, further configure the processor to retrieve content including at least one of a file item, file metadata, text to be displayed to a user, a link to an Internet web site, a command for the computing device, one or more actions to be performed by the computing device, or a combination of one or more of each of two or more of these types of content.

E2. The computer program product of paragraph E0, wherein the computer readable program instructions, when executed by the processor, further configure the processor to retrieve a plurality of data items for selection by a user, and display the plurality of data items, and receive on the signal processing device an input from a user selecting at least one of the plurality of displayed data items.

E3. The computer program product of paragraph E3, wherein the computer readable program instructions, when executed by the processor, further configure the processor to send to a remote server associated with the code signal an indication as to the at least one of the plurality of data items selected by the user.

E4. The computer program product of paragraph E2, wherein the computer readable program instructions, when executed by the processor, further configure the processor to, in response to receiving an input from a user selecting at least one of the plurality of displayed data items, send to a remote server associated with the code signal information about the signal processing device at the time of the selection or information related to the selection.

E5. The computer program product of paragraph E4, wherein the computer readable program instructions, when executed by the processor, further configure the processor to send one or more items of information selected in any combination from the group of an identification of the signal processing device, an ambient condition of the signal processing device that is detected by the signal processing device, a date of the selection, and a time of the selection.

E6. The computer program product of paragraph E0, wherein the computer readable program instructions, when executed by the processor, further configure the processor to receive sound from a speaker outputting a composite signal having a plurality of code signals, detect the output sound corresponding to the plurality of code signals, and determine the code corresponding to a selected one of the code signals.

E7. The computer program product of paragraph E6, wherein the computer readable program instructions, when executed by the processor, further configure the processor to receive sound from the speaker outputting a composite signal in which each of the plurality of code signals have a different frequency spectrum, and determine the code corresponding to the code signal having a predetermined frequency spectrum.

E8. The computer program product of paragraph E7, wherein the computer readable program instructions, when executed by the processor, further configure the processor to receive sound from the speaker outputting a composite signal in which each of the plurality of code signals has an associated second frequency bandwidth that is within the upper half of the first frequency bandwidth.

E9. The computer program product of paragraph E0, wherein the computer readable program instructions, when executed by the processor, further configure the processor to receive sound from the speaker outputting a composite signal in which the second frequency bandwidth is within the upper half of the first frequency bandwidth.

F0. A computer program product, comprising at least one non-transitory computer readable storage medium having computer readable program instructions embodied therewith, the computer readable program instructions, when executed by a processor, configuring the processor to: receive sound from a speaker outputting a composite signal including an audio base signal and a code signal, as sound, the composite signal having frequencies within a sonic first frequency bandwidth, and the code signal being encoded with a code, having a duration shorter than a duration of the base signal, and having a second frequency bandwidth within the first frequency bandwidth; detect the output sound corresponding to the code signal; determine the code from the detected output sound corresponding to the code signal; automatically in response to determining the code and prior to displaying information in response to determining the code, determine whether code-associated data associated with the code is stored on an internal data storage device of the signal processing device, and if it is determined that the code-associated data is stored on the internal data storage device, retrieve from the internal data storage device, the code-associated data, and if it is determined that the code-associated data is not stored on the internal data storage device, retrieve the code-associated data from a data-base server that is remote from the signal processing device and has an associated data storage device storing in a code data base a plurality of different codes and respective code-associated data for each of the plurality of different codes; automatically in response to determining the code, send to the data-base server signal-processing-device-specific data, the signal-processing-device-specific data including data representative of a device unique identification number; display the retrieved code-associated data; receive a user input that is input using the displayed code-associated data; and automatically in response to receiving the user input, send to the data-base server the signal-processing-device-specific data also including data representative of the specific user action taken.

F1. The computer program product of paragraph F0, wherein the computer readable program instructions, when executed by the processor, configure the processor to retrieve code-associated data including at least one of a file item, file metadata, text to be displayed to a user, a link to an Internet web site, a command for the computing device, or one or more actions to be performed by the computing device.

F2. The computer program product of paragraph F0, wherein the computer readable program instructions, when executed by the processor, configure the processor to retrieve code-associated data including a plurality of data items for selection by a user, display the plurality of data items, and receive on the signal processing device an input from a user selecting at least one of the plurality of displayed data items.

F3. The computer program product of paragraph F0, wherein the computer readable program instructions, when executed by the processor, further configure the processor to receive sound from a speaker outputting a composite signal having a plurality of code signals, detect the output sound corresponding to the plurality of code signals, and determine the code corresponding to a selected one of the code signals.

F4. The computer program product of paragraph F3, wherein the computer readable program instructions, when executed by the processor, further configure the processor to receive sound from the speaker outputting a composite signal in which at least two code signals of the plurality of code signals have the same code and different frequency spectra, and determine the code corresponding to the code signal having a predetermined one of the frequency spectra of the at least two code signals.

The disclosure set forth above may describe multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

The invention claimed is:

1. A method comprising:
receiving on a signal processing device a code and code-associated data associated with the code from a data-base server that is remote from the signal processing device;
storing on an internal data storage device of the signal processing device the received code and the code-associated data;
after storing on the internal data storage device the received code and code-associated data, receiving from a communication media on a signal receiver a composite signal having frequencies within a sonic first frequency bandwidth, the composite signal including an audio base signal and at least one code signal, the code signal being encoded with the code, having a duration shorter than a duration of the base signal, and having a second frequency bandwidth within the first frequency bandwidth;
outputting the composite signal on a speaker, the speaker converting the composite signal into sound;
while outputting the composite signal, detecting by the signal processing device the output sound corresponding to the code signal;
determining the code from the detected output sound corresponding to the code signal;
automatically in response to determining the code and prior to displaying information in response to determining the code, determining whether code-associated data associated with the code is stored on the internal data storage device of the signal processing device, and if it is determined that the code-associated data is stored on the internal data storage device, retrieving from the internal data storage device the code-associated data; and
displaying on a display device of the signal processing device the retrieved code-associated data.

2. The method of claim 1, wherein receiving and storing the code-associated data includes receiving and storing at least one of a file item, file metadata, text to be displayed to a user, a link to an Internet web site, a command for the computing device, or one or more actions to be performed by the signal processing device.

3. The method of claim 1, wherein retrieving the code-associated data includes retrieving a plurality of data items for selection by a user, and displaying the retrieved code-associated data includes displaying the plurality of data items, and the method further including receiving a user input selecting at least one of the plurality of displayed data items.

4. The method of claim 1, wherein receiving a composite signal includes receiving a composite signal having a plurality of code signals, detecting the output sound corresponding to the code signal includes detecting the output sound corresponding to the plurality of code signals, and determining the code corresponding to the code signal includes determining the code corresponding to a selected one of the code signals.

5. The method of claim 4, wherein receiving a composite signal having the plurality of code signals includes receiving a composite signal having at least two code signals having the same code and different frequency spectra.

6. The method of claim 1, further comprising automatically in response to determining the code, sending to the data-base server signal-processing-device-specific data, the signal-processing-device-specific data including data representative of a device unique identification number.

7. The method of claim 6, further comprising:
receiving on the signal processing device a user input that is input using the displayed code-associated data; and
automatically in response to receiving the user input, sending to the data-base server the signal-processing-device-specific data also including data representative of the specific user action taken.

8. A receiver assembly comprising:
a signal receiver for receiving from a communication media a composite signal having frequencies within a sonic first frequency bandwidth, the composite signal including an audio base signal and a code signal, the code signal being encoded with a code, having a duration shorter than a duration of the base signal, and having a second frequency bandwidth within the first frequency bandwidth;
a speaker operatively coupled to the signal receiver for outputting the composite signal, including the audio base signal and the code signal, as sound; and
a signal processing device configured to:
receive on a signal processing device a code and code-associated data associated with the code from a data-base server that is remote from the signal processing device;
store on an internal data storage device of the signal processing device the received code and the code-associated data;
detect the output sound corresponding to the code signal;
determine the code from the detected output sound corresponding to the code signal;
automatically in response to determining the code and prior to displaying information in response to determining the code, determine whether code-associated data associated with the code is stored on the internal data storage device of the signal processing device, and if it is determined that the code-associated data is stored on the internal data storage device, retrieve the code-associated data from the internal data storage device; and
display the retrieved code-associated data.

9. The receiver assembly of claim 8, wherein the signal processing device is configured to receive and store the code-associated data including at least one of a file item, file metadata, text to be displayed to a user, a link to an Internet web site, a command for the computing device, or one or more actions to be performed by the signal processing device.

10. The receiver assembly of claim 8, wherein the signal processing device is configured to retrieve code-associated data including a plurality of data items for selection by a user, display the plurality of data items, and receive an input from a user selecting at least one of the plurality of displayed data items.

11. The receiver assembly of claim 8, wherein the signal receiver is further configured to receive a composite signal having a plurality of code signals, and the signal processing device is further configured to detect the output sound corresponding to the plurality of code signals, and determine the code corresponding to a selected one of the code signals.

12. The receiver assembly of claim 11, wherein the signal receiver is further configured to receive a composite signal in which at least two of the plurality of code signals have the same code and different frequency spectra.

13. The receiver assembly of claim 8, wherein the signal receiver is further configured to automatically in response to determining the code, send to the data-base server signal-processing-device-specific data, the signal-processing-device-specific data including data representative of a device unique identification number.

14. The receiver assembly of claim 13, wherein the signal receiver is further configured to:
  receive a user input that is input using the displayed code-associated data; and
  automatically in response to receiving the user input, send to the data-base server the signal-processing-device-specific data also including data representative of the specific user action taken.

15. A computer program product, comprising:
  at least one non-transitory computer readable storage medium having computer readable program instructions embodied therewith, the computer readable program instructions, when executed by a processor of a signal processing device, configuring the processor to:
  receive a code and code-associated data associated with the code from a data-base server that is remote from the signal processing device;
  store on an internal data storage device of the signal processing device the received code and the code-associated data;
  receive sound from a speaker outputting a composite signal including an audio base signal and a code signal, as sound, the composite signal having frequencies within a sonic first frequency bandwidth, and the code signal being encoded with a code, having a duration shorter than a duration of the base signal, and having a second frequency bandwidth within the first frequency bandwidth;
  detect the output sound corresponding to the code signal;
  determine the code from the detected output sound corresponding to the code signal;
  automatically in response to determining the code and prior to displaying information in response to determining the code, determine whether code-associated data associated with the code is stored on an internal data storage device of the signal processing device, and if it is determined that the code-associated data is stored on the internal data storage device, retrieve from the internal data storage device, the code-associated data; and
  display the retrieved code-associated data.

16. The computer program product of claim 15, wherein the computer readable program instructions, when executed by the processor, configure the processor to receive and store the code-associated data including at least one of a file item, file metadata, text to be displayed to a user, a link to an Internet web site, a command for the computing device, or one or more actions to be performed by the computing device.

17. The computer program product of claim 15, wherein the computer readable program instructions, when executed by the processor, configure the processor to retrieve the code-associated data including a plurality of data items for selection by a user, display the plurality of data items, and receive on the signal processing device an input from a user selecting at least one of the plurality of displayed data items.

18. The computer program product of claim 15, wherein the computer readable program instructions, when executed by the processor, further configure the processor to receive sound from a speaker outputting a composite signal having a plurality of code signals, detect the output sound corresponding to the plurality of code signals, and determine the code corresponding to a selected one of the code signals.

19. The computer program product of claim 15, wherein the computer readable program instructions, when executed by the processor, further configure the processor to receive sound from the speaker outputting a composite signal in which at least two code signals of the plurality of code signals have the same code and different frequency spectra, and determine the code corresponding to the code signal having a predetermined one of the frequency spectra of the at least two code signals.

20. The computer program product of claim 15, wherein the computer readable program instructions, when executed by the processor, further configure the processor to:
  automatically in response to determining the code, send to the data-base server signal-processing-device-specific data, the signal-processing-device-specific data including data representative of a device unique identification number;
  receive on the signal processing device a user input that is input using the displayed code-associated data; and
  automatically in response to receiving the user input, send to the data-base server the signal-processing-device-specific data also including data representative of the specific user action taken.

* * * * *